US011619199B2

United States Patent
Ito et al.

(10) Patent No.: US 11,619,199 B2
(45) Date of Patent: Apr. 4, 2023

(54) COVER FOR FUEL TANK

(71) Applicant: AISAN KOGYO KABUSHIKI KAISHA, Obu (JP)

(72) Inventors: Satoshi Ito, Toyohashi (JP); Koji Yoshida, Commerce Township, MI (US); Takashi Kanie, Kariya (JP); Kensuke Niwa, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 403 days.

(21) Appl. No.: 17/042,233

(22) PCT Filed: Mar. 26, 2019

(86) PCT No.: PCT/JP2019/012847
§ 371 (c)(1),
(2) Date: Sep. 28, 2020

(87) PCT Pub. No.: WO2019/189178
PCT Pub. Date: Oct. 3, 2019

(65) Prior Publication Data
US 2021/0033051 A1    Feb. 4, 2021

(30) Foreign Application Priority Data
Mar. 28, 2018   (JP) .............................. JP2018-061623

(51) Int. Cl.
| F02M 37/10 | (2006.01) |
| B60K 15/05 | (2006.01) |
| F16M 13/02 | (2006.01) |

(52) U.S. Cl.
CPC ........... *F02M 37/103* (2013.01); *B60K 15/05* (2013.01); *F16M 13/022* (2013.01)

(58) Field of Classification Search
CPC combination set(s) only.
See application file for complete search history.

(56) References Cited

U.S. PATENT DOCUMENTS

| 5,482,444 A | * | 1/1996 | Coha | ................... | F02M 37/106 |
| | | | | | 417/363 |
| 7,415,974 B2 | * | 8/2008 | Akiba | .................. | F02M 37/106 |
| | | | | | 123/511 |

(Continued)

FOREIGN PATENT DOCUMENTS

| JP | 2012202231 A | 10/2012 |
| JP | 2014238054 A | 12/2014 |

(Continued)

OTHER PUBLICATIONS

PCT/JP2019/012847 International Search Report and Written Opinion dated Jun. 18, 2019 (7 p.).

(Continued)

*Primary Examiner* — Monica E Millner
(74) *Attorney, Agent, or Firm* — Conley Rose, P.C.

(57) ABSTRACT

A cover for a fuel tank includes a flange unit configured to close an opening of the fuel tank and a joint member movably coupled to the flange unit. The joint member is configured to move in an upward/downward direction relative to the flange unit. Two side tubular portions extend from the flange unit in the upward/downward direction and are positioned side-by-side. Column portions extend in the upward/downward direction from the joint member. The column portions are moveably disposed in the side tubular portions. The column portions are configured to move in the upward/downward direction relative to the side tubular portions. The side tubular portions are connected to each other via a rear side wall and a front side wall of a center tubular portion disposed between the side tubular portions.

14 Claims, 23 Drawing Sheets

(56) References Cited

U.S. PATENT DOCUMENTS

| | | | |
|---|---|---|---|
| 7,472,693 B2* | 1/2009 | Izutani | F02M 37/46 |
| | | | 123/509 |
| 9,388,780 B2 | 7/2016 | Oikawa et al. | |
| 10,648,436 B2 | 5/2020 | Adachi et al. | |
| 10,794,342 B2* | 10/2020 | Maruyama | F02M 37/10 |
| 11,174,824 B2* | 11/2021 | Ito | B60K 15/03 |
| 11,396,856 B2* | 7/2022 | Higashi | F02M 37/0052 |
| 2004/0037714 A1* | 2/2004 | Koba | F02M 37/103 |
| | | | 417/360 |
| 2004/0163630 A1* | 8/2004 | Powell | F02M 37/025 |
| | | | 123/509 |
| 2005/0217733 A1* | 10/2005 | Hayakawa | F02M 37/106 |
| | | | 137/565.17 |
| 2007/0056567 A1* | 3/2007 | Perruchot | F02M 37/106 |
| | | | 123/509 |
| 2009/0028690 A1* | 1/2009 | Kawajiri | F02M 37/048 |
| | | | 415/55.1 |
| 2011/0168134 A1* | 7/2011 | Lim | F02M 37/103 |
| | | | 123/509 |
| 2012/0060948 A1 | 3/2012 | Okazono et al. | |
| 2016/0238172 A1* | 8/2016 | Ishitoya | F02M 37/50 |
| 2017/0241386 A1* | 8/2017 | Mason | F02M 37/14 |
| 2018/0335002 A1* | 11/2018 | Ikeya | F02M 37/0011 |
| 2019/0003433 A1* | 1/2019 | Canitano | B60K 15/03 |
| 2019/0047405 A1 | 2/2019 | Niwa et al. | |
| 2019/0136809 A1* | 5/2019 | Fujiseki | F02M 37/106 |
| 2019/0211785 A1* | 7/2019 | Akiba | F02M 37/10 |
| 2019/0331073 A1* | 10/2019 | Higashi | F02M 37/04 |
| 2020/0080525 A1* | 3/2020 | Soreo | F04B 49/04 |
| 2021/0033053 A1* | 2/2021 | Hayashi | F02M 59/48 |

FOREIGN PATENT DOCUMENTS

| | | |
|---|---|---|
| JP | 2017166472 A | 9/2017 |
| JP | 2019173631 A | 10/2019 |
| WO | 2017141595 A1 | 8/2017 |
| WO | 2019187739 A1 | 10/2019 |

OTHER PUBLICATIONS

PCT/JP2019/012847 Article 34 Amendments dated Sep. 12, 2019 (12 p.).

PCT/JP2019/012847 International Preliminary Report on Patentability dated Oct. 1, 2020 (8 p.).

English Translation of PCT/JP2019/012847 International Preliminary Report on Patentability dated Oct. 1, 2020 (5 p.).

* cited by examiner

COVER FOR FUEL TANK

CROSS-REFERENCE TO RELATED APPLICATIONS

The present application is a 35 U.S.C. § 371 national stage application of, and claims to the benefit of, PCT Application No. PCT/JP2019/012847 filed Mar. 26, 2019, which claims priority to Japanese Patent Application No. 2018-061623 filed Mar. 28, 2018, each of which is incorporated herein by reference in its entirety for all purposes.

STATEMENT REGARDING FEDERALLY SPONSORED RESEARCH OR DEVELOPMENT

Not applicable.

BACKGROUND

The present disclosure relates generally to covers for fuel tank.

A fuel supply device for supplying fuel within a fuel tank installed in a vehicle (e.g., an automobile or the like) to an internal combustion engine (i.e., an engine) is described, for example, in Japanese Laid-Open Patent Publication No. 2017-166472. As described in Japanese Laid-Open Patent Publication No. 2017-166472, a cover for a fuel tank includes a cover member configured to close an opening of the fuel tank and a connecting member connected to the cover member so as to be movable in the upward/downward direction. Tubular portions extending in the upward/downward direction are formed on the cover member. Columnar portions extending in the upward/downward direction are formed on the connecting member. The columnar portions are inserted in the tubular portions so as to be movable in the upward/downward direction. An essential part of the cover member and an essential part of the connecting member are made of resin.

SUMMARY

A first aspect of this disclosure is a cover for a fuel tank comprising a cover member configured to close an opening of the fuel tank and a connecting member configured to be connected to the cover member so as to be movable in an upward/downward direction. A plurality of tubular portions extending in the upward/downward direction are formed side by side on the cover member. At least one columnar portion extending in the upward/downward direction is formed on the connecting member. The at least one columnar portion is inserted in one of the plurality of tubular portions so as to be movable in the upward/downward direction. Opposing parts of two of the plurality of the tubular portions may be connected via a connecting portion.

According to the first aspect, the strength at the two tubular portions is enhanced as the opposing parts of the tubular portions at the cover member are connected to each other via the connecting portion. It is thus possible to reduce and suppress the deformation of the cover member due to an external force.

A second aspect is the cover for the fuel tank according to the first aspect where the connecting portion is a bridge portion installed between the opposing parts of the two tubular portions, where the opposing parts are spaced apart from one another.

According to the second aspect, it is possible to enhance the strength of the two tubular portions, which are in a separated positional relation.

A third aspect is the cover for the fuel tank according to the first aspect where the two tubular portions are disposed adjacent to each other, and the connecting portion is a common wall portion sharing the opposing parts of the two tubular portions.

According to the third aspect, it is possible to enhance the strength of the two tubular portions disposed in a close positional relation.

A fourth aspect is the cover member for the fuel tank according to any one of the first to third aspects, where a circular arc wall portion in a circular shape extending radially outward is formed on at least one part of at least one tubular portion of the plurality of the tubular portions According to the fourth aspect, the stress concentrations in the tubular portion(s) may be reduced by the circular arc wall portion.

A fifth aspect is the cover for the fuel tank according to the fourth aspect where the circular arc wall portion has a circular arc shape about an axis of the tubular portion.

According to the fifth aspect, the stress concentrations in the tubular portion of the circular arc wall portion may be further reduced.

A sixth aspect is the cover for the fuel tank according to any one of the first to the fifth aspects, where rib-like portions extending in an axial direction are disposed on an inner surface of the at least one tubular portion of the plurality of the tubular portions.

According to the sixth aspect, the strength of the at least one tubular portion may be enhanced by the rib-like portions. Further, in the tubular portions into which the columnar portions are inserted, the sliding resistance of the columnar portions with respect to the tubular portions may be reduced. Furthermore, in the tubular portion into which a coil spring is inserted, the sliding resistance of the coil spring with respect to the tubular portion may be reduced.

A seventh aspect is a cover for a fuel tank comprising a cover member configured to close an opening of a fuel tank and a connecting member configured to be connected to the cover member so as to be movable in an upward/downward direction. Tubular portions extending in an upward/downward direction are formed on the cover member. Columnar portions extending in the upward/downward direction are formed on the connecting member. The columnar portions are be inserted in the tubular portions so as to be movable in the upward/downward direction. A circular arc wall portion in a circular shape extending radially outward is formed on at least one part of the tubular portions According to the seventh aspect, the stress concentrations in the tubular portions may be reduced by the circular arc wall portion. The deformation of the cover member due to the external force may thus be reduced.

An eighth aspect is the cover for the fuel tank according to the seventh aspect where the circular arc wall portion has a circular arc shape about the axis of the tubular portion.

According to the eighth aspect, the stress concentrations in the tubular portion of the circular wall portion may be further reduced.

A ninth aspect is a telescopic connecting structure for connecting a cover member configured to close an opening of a fuel tank and a component in the fuel tank disposed on a bottom of the fuel tank so as to be movable in the upward/downward direction. A tubular portion extending in an upward/downward direction is formed on the cover member. A columnar portion extending in the upward/ downward direction is formed on the component in the fuel tank. The columnar portion is inserted into the tubular portion so as to be movable in the upward/downward direction. At least one guide rib extending in the axial direction and configured to slidably guide the columnar portion is disposed on an inner surfaces of the tubular portions.

According to the ninth aspect, a contact area between the columnar potion and the tubular portion is reduced when the guide rib slidably guides the columnar portions when expanded and contracted, and the sliding resistance of the columnar portion with respect to the tubular portion may be reduced. Therefore, slidability of the columnar portion with respect to the tubular portion may be improved, thereby enabling the columnar portion to smoothly slide. Further, the strength of the tubular portion may be enhanced by the guide rib.

A tenth aspect is the telescopic connecting structure according to the ninth aspect where an outer surface of the columnar portion includes a flat surface that is linear in a cross section oriented perpendicular to the axial direction. The guide rib faces the flat surface.

According to the tenth aspect, the guide rib slidably contacts the flat surface of the columnar portion, thereby enhancing the stability of the columnar portion as compared to the guide rib slidably contacting a non-flat surface.

An eleventh aspect is the telescopic connecting structure according to the tenth aspect where more than one guide rib face the flat surface.

According to the eleventh aspect, it is possible to reduce and/or prevent displacement of the columnar portions with respect to the tubular portions in the circumferential direction about the axis, and to prevent a reduction of the slidability of the columnar portions due to such displacement.

A twelfth aspect is the telescopic connecting structure according to the eleventh aspect where two guide ribs of the plurality of the guide ribs facing the flat surface are disposed in positions facing both ends of the flat surface.

According to the twelfth aspect, a distance between the two guide ribs is increased in comparison with a case where the two guide ribs facing the flat surface of the columnar portion are disposed in positions other than at the both ends of the flat surface. This may reduce the displacement amount (rotation amount) of the columnar portion in the circumferential direction about the axis with respect to the tubular portion.

A thirteenth aspect is the telescopic structure according to the eleventh or twelfth aspect, where the outer surface of the columnar portion includes four flat surfaces forming a rectangular shape in a cross section perpendicular to the axial direction. The number of the at least one guide ribs facing each flat surface may be two. When the columnar portion is displaced in the circumferential direction about the axis with respect to the tubular portion, each flat surface contacts one of the two guide ribs facing the corresponding flat surface.

According to the thirteenth aspect, it is possible to consistently prevent displacement of the columnar portions with respect to the tubular portions in the circumferential direction about the axis. Further, it is possible to prevent engagement of projecting corners of the columnar portion between the adjacent guide ribs due to displacement of the columnar portion with respect to the tubular portion in the circumferential direction about the axis. This may prevent a reduction of slidablity of the columnar portions.

A fourteenth aspect is the telescopic connecting structure according to the thirteenth aspect, where projecting curved surfaces having a projecting circular arc shape in a cross section perpendicular to the axial direction are formed on at least one of the projecting corners on the outer surface of the columnar portion, while a recessed curved surface in a form of a recessed circular arc shape facing the projecting curved surface and perpendicular to the axial direction is disposed on an inner surface of the tubular portion.

According to the fourteenth aspect, it is possible to reduce stress concentrations in a radial direction and an axial direction within the tubular portions and columnar portions in the event of vehicle collision. It is also possible to reduce an outer shape of the tubular portion with respect to the columnar portion or to increase the outer shape of the columnar portion with respect to the tubular portion by narrowing the facing distance between the projecting curved surfaces and the recessed curved surfaces.

A fifteenth aspect is the telescopic connecting structure according to the fourteenth aspect, where the columnar portion has a substantially rectangular columnar shape. The average thickness of the tubular portion is greater than the average thickness of the columnar portion.

According to the fifteenth aspect, the strength of the tubular portion may be greater than the strength of the columnar portion so as to prevent the tubular portions from breaking in the event of vehicle collision.

DETAILED DESCRIPTION

If the cover member for closing an opening of a fuel tank deforms when an external force is applied in the event of vehicle collision, a fuel leakage may occur. It is therefore desired to suppress deformation of the cover member due to external forces. As previously described, Japanese Laid-Open Patent Publication No. 2017-166472 teaches a cover for a fuel tank including a cover member configured to close an opening of the fuel tank, tubular portions extending in the upward/downward direction from the cover member, and columnar portions extending in the upward/downward direction from connecting member. The columnar portions are inserted in the tubular portions so as to be movable in the upward/downward direction. However, Japanese Laid-Open Patent Publication No. 2017-166472 does not describe a structure for suppressing deformation of the cover member when an external force is applied in the event of a vehicle collision. Further, deformation of the cover member may be attributed to a lack of strength at the tubular portions or a stress concentration in the tubular portions. Furthermore, areas of the columnar potions that slidably engage the tubular portions may be large during expansion and contraction, thereby increasing the sliding resistance therebetween. Therefore, there has been a need for improved cover for a fuel tank.

Hereinafter, embodiments of apparatus and methods of the present application will now be described with reference to drawings.

Figure 1:
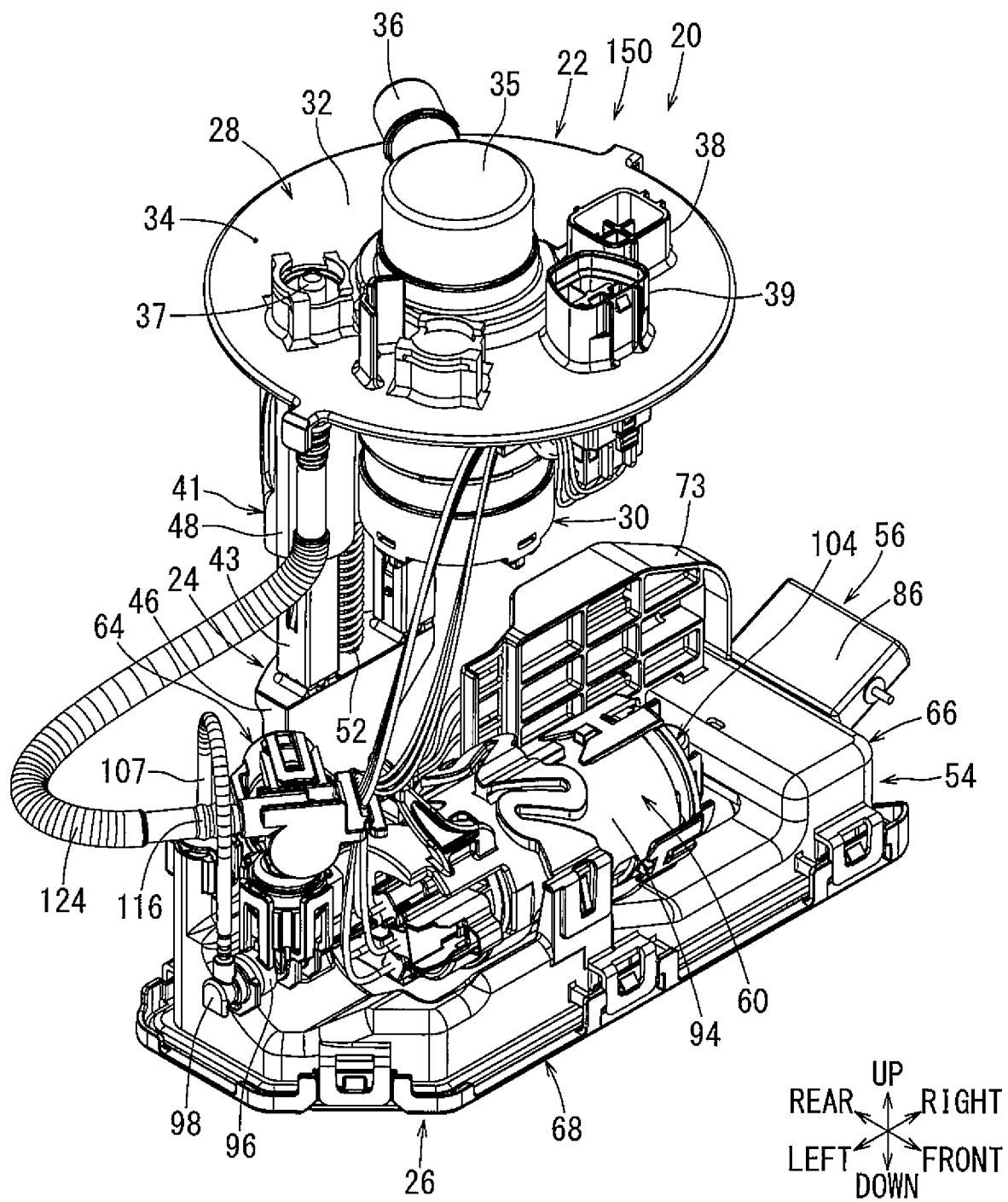
FIG. 1 is a perspective view of a fuel supply device according to a first embodiment.
Figure 2:
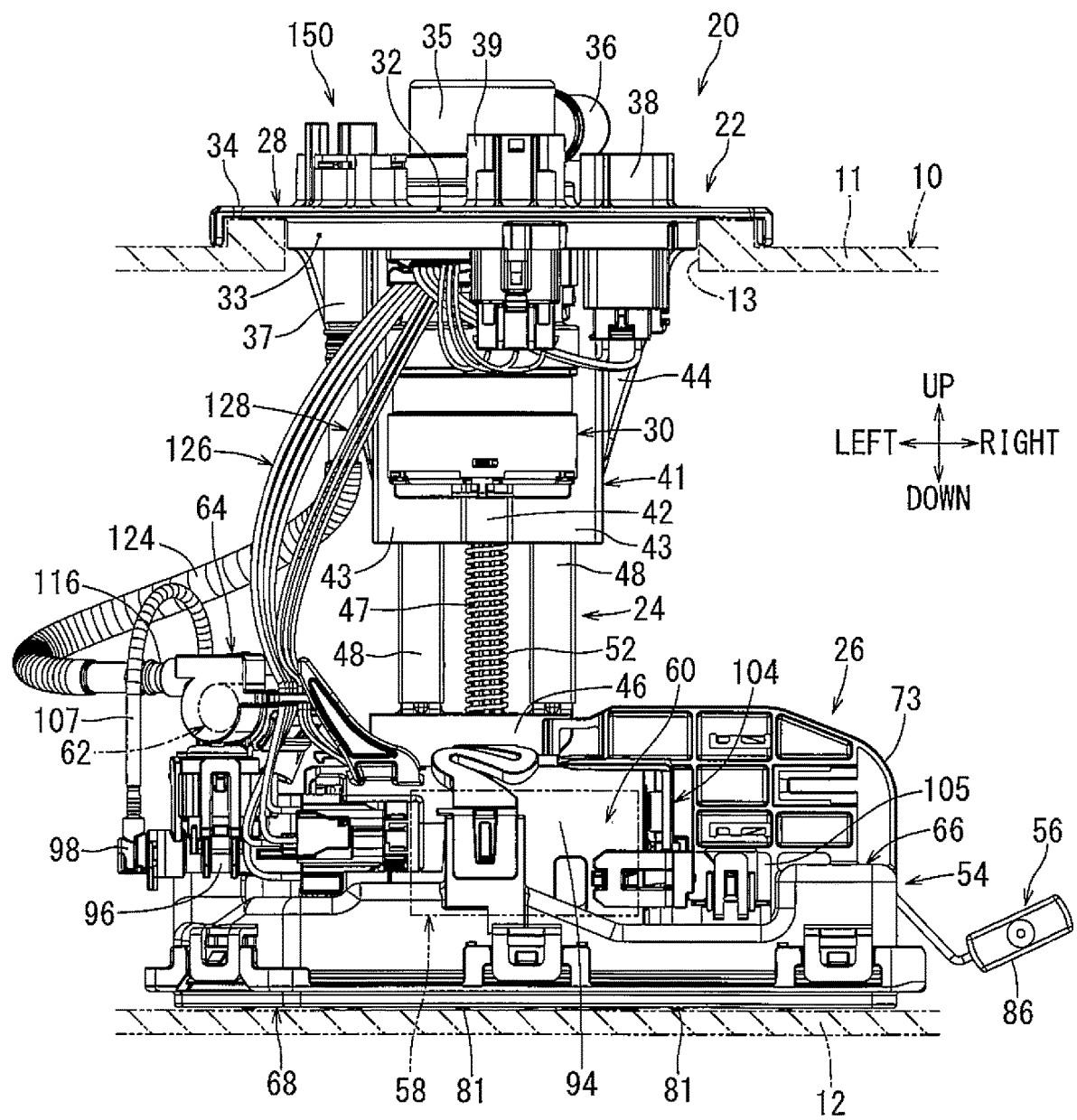
FIG. 2 is a front view of the fuel supply device of FIG. 1.
Figure 3:
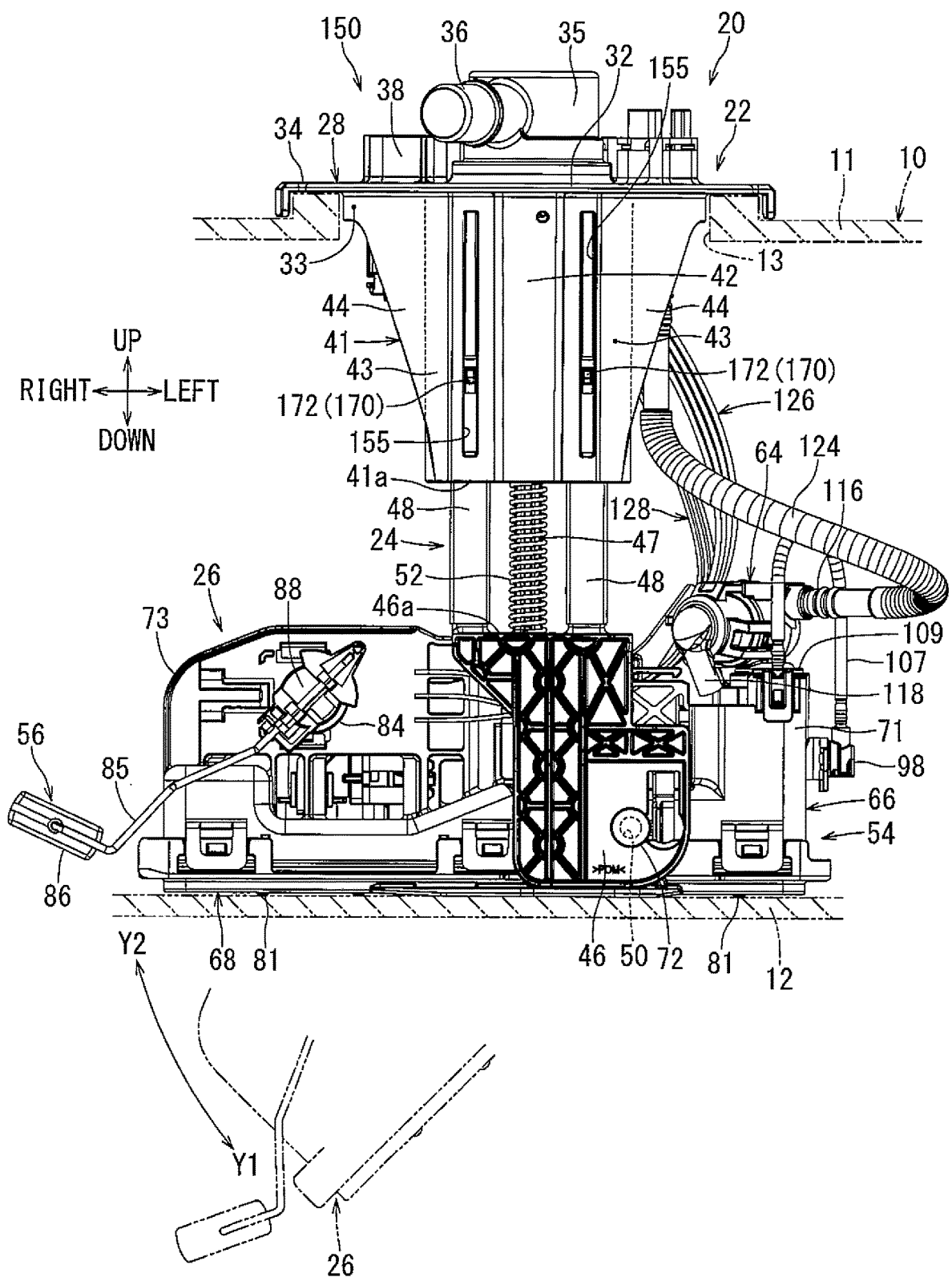
FIG. 3 is a rear view of the fuel supply device of FIG. 1.

Hereinafter, a first embodiment will be described with reference to the drawings. A cover for a fuel tank according to the present embodiment may be used for a fuel supply device having a telescopic connecting structure. The fuel supply device may be installed in the fuel tank mounted on a vehicle (e.g., as an automobile or the like) equipped with an engine (e.g., an internal combustion engine) and may serve to supply fuel within the fuel tank to the engine. FIG. 1 is a perspective view of an embodiment of a fuel supply device. FIG. 2 is a front view of the same. FIG. 3 is a rear view of the same. In FIGS. 1 to 3, frontward, rearward, leftward, rightward, upward, and downward directions are shown and correspond to directions of a vehicle. More specifically, the frontward/rearward direction corresponds to a vehicle length direction, the leftward/rightward direction corresponds to a vehicle width direction, and the upward/downward direction corresponds to a vehicle height direction. The frontward/rearward direction and the leftward/rightward direction of the fuel supply device may be oriented in any direction.

As shown in FIG. 2, a fuel tank 10 may be formed as a hollow container having an upper wall 11 and a bottom wall 12. An opening 13 may be formed as a circular hole in the upper wall 11. The fuel tank 10 may be mounted on a vehicle such that the upper wall 11 and the bottom wall 12 extend horizontally. The fuel tank 10 may be made of resin and may deform (expand or contract mainly in the upward/downward direction) in response to change in tank internal pressure. For example, gasoline as liquid fuel may be stored in the fuel tank 10.

As shown in FIG. 1, a fuel supply device 20 includes a flange unit 22, a joint member 24, and a pump unit 26. The joint member 24 is connected to the flange unit 22 so as to be movable in the upward/downward direction relative thereto, and the pump unit 26 is connected to the joint member 24 so as to be rotatable in the upward/downward direction relative thereto.

The flange unit 22 includes a flange main body 28 and a fuel vapor valve 30.

The flange main body 28 comprises a cover plate 32 having a circular plate shape. The flange main body 28 may be made of resin. As shown in FIG. 2, a fitting tubular portion 33 having a short cylindrical shape is concentrically formed on a lower surface of the cover plate 32. An annular disc-like flange portion 34 extends radially outward from the fitting tubular portion 33 around an outer periphery of the cover plate 32. A valve housing 35 having a closed-topped cylindrical shape is concentrically formed on the cover plate 32. An evaporation port 36 extends radially outward from an upper end of the valve housing 35.

As shown in FIG. 1, a fuel outlet port 37, a first electric connector portion 38 and a second electric connector portion 39 are provided on the cover plate 32. The fuel outlet port 37 is a straight tube extending through the cover plate 32 in the upward/downward direction. A predetermined number of metal terminals are disposed in both electric connector portions 38, 39. The fuel outlet port 37 and both electric connector portions 38, 39 are circumferentially-spaced around the valve housing 35.

As shown in FIG. 3, a standoff portion 41 is disposed on a rear side of the lower surface of the cover plate 32. The standoff portion 41 includes a center tubular portion 42, a left side tubular portion 43, and a right side tubular portion 43. Each tubular portion 42, 43 has a tubular shape extending in the upward/downward direction. The center tubular portion 42 and both side tubular portions 43 are formed symmetrically. Two left and right curved wall portions 44 are symmetrically formed on outer side portions of both side tubular portions 43. The center tubular portion 42 and both side tubular portions 43 are arranged side by side in the leftward/rightward direction. Rear side wall portions of the center tubular portion 42 and both side tubular portions 43 and both curved wall portions 44 are continuous with a rear half of the fitting tubular portion 33 of the flange main body 28. In this embodiment, both curved wall portions 44 have a substantially triangular shape, which are tapered downward from the fitting tubular portion 33 as viewed from the back.

As shown in FIG. 2, the fuel vapor valve 30 is attached within the valve housing 35 of the flange main body 28 such that the top portion of the fuel vapor valve 30 is accommodated. As the fuel vapor valve 30, an integrated valve having, for example, a fuel vapor control valve and a full-tank regulating valve may be used. The fuel vapor control valve closes when the internal pressure in the fuel tank is smaller than the predetermined value, and opens when the internal pressure becomes greater than the predetermined value. Further, the full-tank regulating valve opens when fuel in the fuel tank 10 is not full, and closes when filled full with fuel.

As shown in FIG. 3, the joint member 24 includes a joint main body 46, a spring guide 47, a left side columnar portion 48, and a right side columnar portions 48. The joint main body 46 may be made of resin, and may be formed in a flat block shape in the frontward/rearward direction. The joint member 24 has a horizontal upper end face 46a. An engagement shaft hole 50 extends through a lower portion of the joint main body 46 in the frontward/rearward direction. In this embodiment, the spring guide 47 is formed like a strut on the center of the upper end face 46a of the joint main body 46. Both side columnar portions 48 are formed symmetrically and in a rectangular columnar shape on both left and right ends of the upper end face 46a of the joint main body 46.

A metal cylindrical coil spring 52 is fitted onto the spring guide 47 of the joint member 24. In this state, the spring guide 47 of the joint member 24 is inserted into the center tubular portion 42 of the flange main body 28 together with the coil spring 52. Further, both side columnar portions 48 of the joint member 24 are simultaneously inserted into both side tubular portions 43 of the flange main body 28. The side tubular portions 43 and the corresponding side columnar portions 48 are connected by snap-fitting so as to be relatively movable in the axial direction within the predetermined range. Moreover, the flange main body 28 and the joint main body 46 are biased apart (i.e., away from each other) by the coil spring 52.

Figure 4:
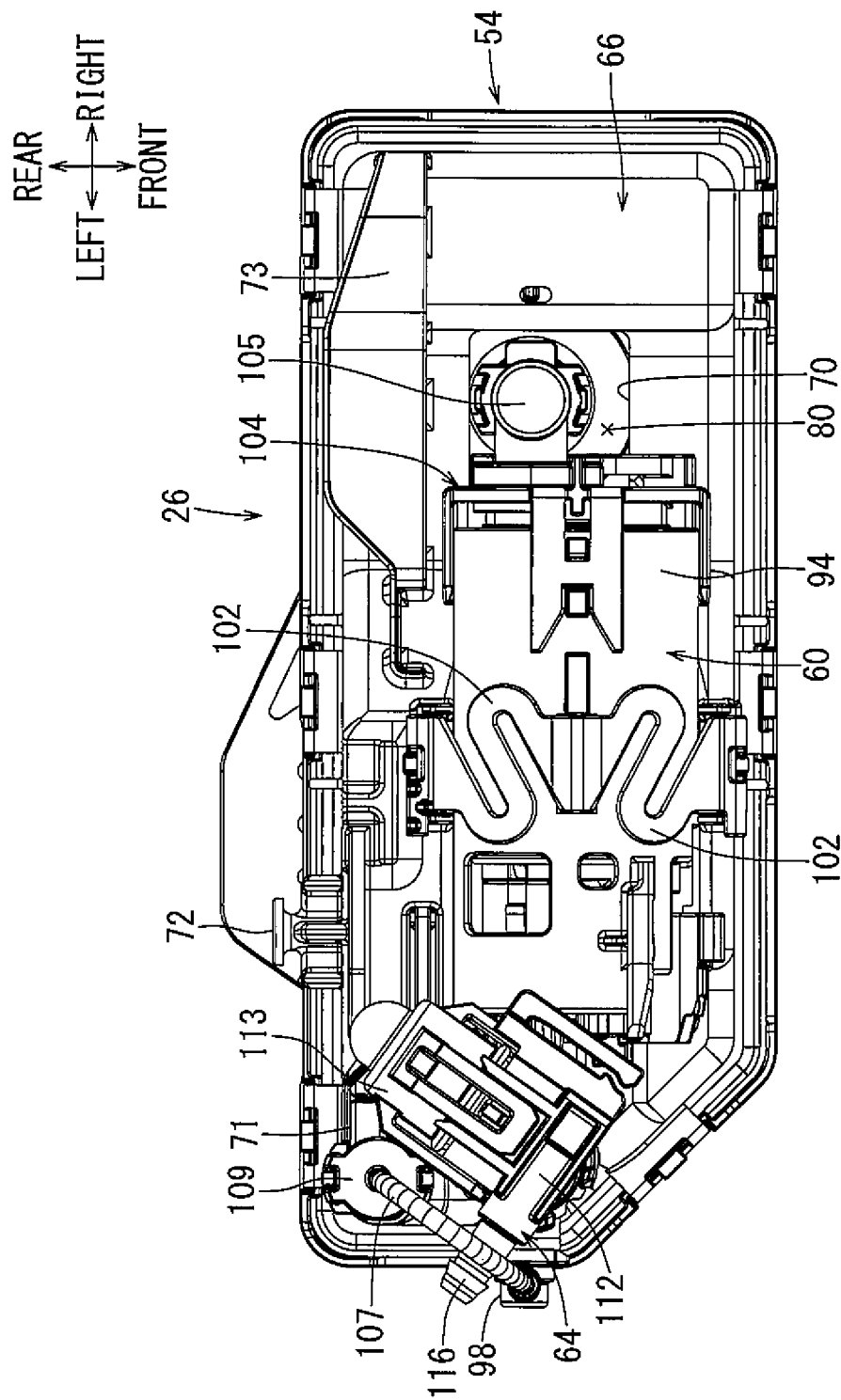
FIG. 4 is a top view of the pump unit of FIG. 1.
Figure 5:
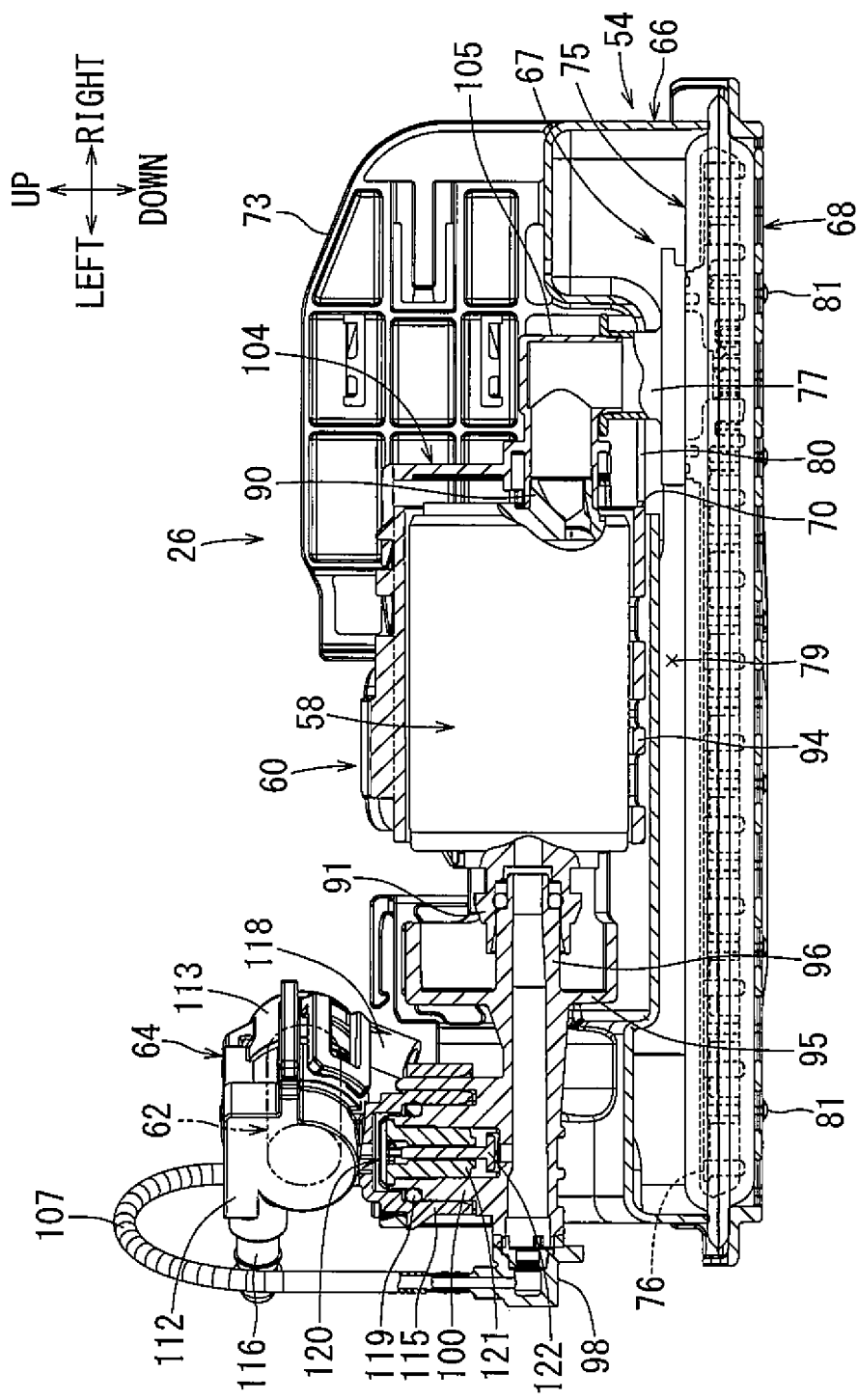
FIG. 5 is a front, partial cutaway view of the pump unit of FIG. 4.

As shown in FIG. 2, the pump unit 26 includes a sub-tank 54, a sender gauge 56, a fuel pump 58, a pump case 60, a pressure regulator 62, and a regulator case 64. FIG. 4 is a top view of the pump unit 26. FIG. 5 is a partially cutaway front view of the pump unit 26. The sender gauge 56 is not shown in FIGS. 4 and 5.

As shown in FIG. 5, the sub-tank 54 includes a sub-tank main body 66, a fuel filter 67, and a cover member 68.

The sub-tank main body 66 may be made of resin and formed in an inverted shallow box shape with the bottom side opened. In particular, the sub-tank main body 66 may be formed to have a rectangular shape elongated in the leftward/rightward direction in a top view (see FIG. 4). A rectangular opening hole 70 is formed to the right on the top side of the sub-tank main body 66. A fuel receiving tubular portion 71 is formed to the left rear of the top side of the sub-tank main body 66 (see FIG. 4). The fuel receiving tubular portion 71 has a rectangular tubular shape extending upwardly. The top side of the fuel receiving tubular portion 71 is opened.

As shown in FIG. 3, a rearward projecting engagement shaft 72 is provided to the left on a lower portion of the rear side of the sub-tank main body 66 (see FIG. 4). Further, a plate-like upright wall 73 facing the frontward/rearward direction is provided on the right rear portion of the top side of the sub-tank main body 66.

As shown in FIG. 5, the fuel filter 67 includes a filter member 75, an inner frame member 76, and a connecting pipe 77. The filter member 75 has a hollow bag shape with a filter material made of resin non-woven fabric. A contour of the filter member 75 has an elongated rectangular shape, which is flat in the upward/downward direction such that its longitudinal direction corresponds to the leftward/rightward direction.

The inner frame member 76 may be made of resin and have a skeleton structure that retains the filter member 75 in an expanded or inflated state in the upward/downward direction. Further, the connecting pipe 77 may be made of resin and has a vertical round tube shape. The connecting pipe 77 is joined on the right portion of the inner frame member 76 by heat fusion. An upper side of the filter member 75 is interleaved between the inner frame member 76 and the connecting pipe 77. The inside and the outside of the filter member 75 may be in fluid communication via the connecting pipe 77.

The filter member 75 is arranged so as to close the bottom opening of the sub-tank main body 66. A fuel storage space 79 for storing fuel is provided between the sub-tank main body 66 and the filter member 75. The connecting pipe 77 is disposed within the opening hole 70 of the sub-tank main body 66. An annular space between the opening hole 70 and the connecting pipe 77 defines a fuel flow inlet 80. The fuel in the fuel tank 10 (see FIG. 2) may flow into the fuel storage space 79 through the flow inlet 80 under its own weight.

The cover member 68 has an elongated rectangular plate shape including a plurality of openings. The cover member 68 may be made of resin. The cover member 68 is attached to the sub-tank main body 66 by snap-fitting. A peripheral edge of the filter member 75 is interleaved between peripheral edges of the sub-tank main body 66 and the cover member 68. The cover member 68 covers a lower side of the filter member 75. A plurality of spaced semi-spherical projections 81 are formed on a lower side of the cover member 68.

As shown in FIG. 3, the sender gauge 56 includes a gauge main body 84, an arm 85, and a float 86. The gauge main body 84 is attached to a rear side of the upright wall 73 of the sub-tank main body 66. A base end portion of the arm 85 may be attached to a rotating portion 88, which rotatably couples the arm to the gauge main body 84, thereby allowing the arm 85 to rotate about a horizontal axis. The float 86 is attached to a free end portion of the arm 85. The sender gauge 56 is a liquid level meter configured to detect a residual amount of fuel in the fuel tank 10, i.e., a position of the liquid level.

As shown in FIG. 5, the fuel pump 58 may be an electric fuel pump formed in a substantially cylindrical columnar shape. The fuel pump 58 includes a motor portion and a pump portion that function to draw, pressurize, and discharge the fuel. The fuel pump 58 includes a fuel suction port 90 on a pump portion side end (right end) and a fuel discharge port 91 on a motor portion side end (left end). Further, an electric connector is provided on the motor portion side end of the fuel pump 58. For example, a brushless DC motor may be used for the motor portion.

As shown in FIG. 5, the pump case 60 includes a case main body 94 having a hollow cylindrical shape extending in the leftward/rightward direction. The pump case 60 may be made of resin. An end plate 95 is formed at an opening on one side (a left side opening) of the case main body 94 for closing the opening. A discharge pipe portion 96 comprising a straight tube extends through the end plate 95 and is provided in the center of the end plate 95. A resin pipe joint 98 having an elbow shape is joined at a tip end of the discharge pipe portion 96 by welding. Further, a connecting tubular portion 100 having an upward projecting cylindrical shape is positioned toward the tip end of the discharge pipe portion 96. The inside of the connecting tubular portion 100 is in fluid communication with the inside of the discharge pipe portion 96. The fuel pump 58 is disposed in the case main body 94 with the fuel discharge port 91 oriented to the left. The fuel discharge port 91 is connected to the base end (right end) portion of the discharge pipe portion 96.

As shown in FIG. 4, a pair of front and rear elastic support pieces 102 extending in opposite directions are provided on an upper end of the center of the case main body 94 and are symmetrical in the frontward/rearward direction. Both elastic support pieces 102 may have a strip shape and may be formed in a substantially S-shape in a plan view. The tip ends of both elastic support pieces 102 may be attached to both front and rear sides of the sub-tank main body 66 by snap-fitting. The pump case 60 may be elastically supported on the sub-tank main body 66 in a horizontal state, i.e., a laterally placed state, by both elastic support pieces 102.

As shown in FIG. 5, a resin cap 104 is attached to the case main body 94 by snap-fitting so as to close a right end opening surface of the case main body 94. A suction pipe portion 105 having an elbow pipe shape may be formed on the cap 104. One end (left end) of the suction pipe portion 105 is connected to the fuel suction port 90 of the fuel pump 58. The other end (lower end) of the suction pipe portion 105 is connected to the connecting pipe 77 of the fuel filter 67. The suction pipe portion 105 is attached to the connecting pipe 77 by snap-fitting.

One end of a fuel discharge tube 107 made of a resin flexible tube is connected to the pipe joint 98 by press fitting. A nozzle member 109 is connected to the other end of the fuel discharge tube 107 by press fitting (see FIG. 4). The nozzle member 109 is attached on a left rear portion of the fuel receiving tubular portion 71 by snap-fitting (see FIG. 3). The fuel discharge tube 107 may be bent in an inverted U-shape.

As shown in FIG. 5, a contour of the pressure regulator 62 has a substantially cylindrical columnar shape. The pressure regulator 62 serves to regulate the pressure of the pressurized fuel discharged from the fuel pump 58, i.e., the pressure of fuel to be supplied to an engine, at a predetermined pressure.

The pressure regulator case 64 may be made of resin and is formed to have a hollow cylindrical container shape. The regulator case 64 includes a first case half 112 and a second case half 113 divided in the axial direction. The case halves 112, 113 are attached by snap-fitting. The pressure regulator 62 is disposed in the regulator case 64. The regulator case 64 is disposed in a laterally placed state where the axial direction thereof is horizontal.

A cylindrical connected tubular portion 115 projecting downwardly and a fuel discharge portion 116 projecting outwardly from the upper end in the tangential direction are formed on the first case half 112. The connected tubular portion 115 and the fuel discharge portion 116 are in fluid communication with a fuel introduction port of the pressure regulator 62 within the first case half 112.

A discharge pipe portion 118 projecting downward from an end opposite to the first case half 112 is formed on the second case half 113. The discharge pipe portion 118 is in fluid communication with a surplus fuel discharge port of the pressure regulator 62 disposed in the second case half 113. The fuel discharge portion 116 discharges the fuel, of which pressure is regulated in the pressure regulator 62. Surplus fuel from the pressure regulator 62 is discharged through the discharge pipe portion 118.

The connected tubular portion 115 of the regulator case 64 is fitted so as to be connected to the connecting tubular portion 100 of the pump case 60. An O-ring 119 is interposed between the connecting tubular portion 100 and the connected tubular portion 115 for elastically sealing a gap therebetween. Further, the fuel discharge portion 116 is oriented in the rear left direction from the upper end of the first case half 112 (see FIG. 4). Furthermore, the discharge pipe portion 118 is oriented to the inside of the fuel receiving tubular portion 71 of the sub-tank main body 66 (see FIG. 3).

A check valve 120 is incorporated in the connecting tubular portion 100 of the pump case 60. The check valve 120 may be a residual-pressure retention check valve, which serves to prevent backflow of pressurized fuel in the connecting tubular portion 100. The check valve 120 may include a valve guide 121 and a valve body 122. The valve guide 121 is fixedly disposed within the connecting tubular portion 100. The valve body 122 is disposed in the valve guide 121 so as to be concentric and axially movable (upward/downward direction), i.e., so as to open and close. The valve body 122 may close by its own weight and open by fuel pressure.

As shown in FIG. 3, an engagement shaft 72 of the sub-tank main body 66 is rotatably engaged in an engagement shaft hole 50 of the joint main body 46. As a result, the pump unit 26 is rotatably connected to the joint member 24 in the upward/downward direction (see directions indicated by arrows Y1, Y2 in FIG. 3). The fuel outlet port 37 in the flange main body 28 is connected to the fuel discharge portion 116 at the regulator case 64 via a discharge fuel pipe 124 (see FIG. 2). The discharge fuel pipe 124 may be made of a flexible resin hose or the like. Also, the discharge fuel pipe 124 may be formed in a bellows shape.

As shown in FIG. 2, the first electric connector portion 38 on the flange main body 28 may be electrically connected to an electric connector for the fuel pump 58 via a first wire harness 126. The second electric connector portion 39 on the flange main body 28 may be electrically connected to the gauge main body 84 of the sender gauge 56 (see FIG. 3) via a second wire harness 128. The first wire harness 126 and the second wire harness 128 may be properly hooked to a wiring hook portion, which is integrally formed with an adjacent resin member.

The fuel supply device 20 is extended when being installed in the fuel tank 10. In this state, the joint member 24 is suspended by the flange unit 22 while the pump unit 26 is suspended by the joint member 24. Specifically, the joint member 24 is lowered to its lowermost position (farthest position) with respect to the flange unit 22. Further, the pump unit 26 is rotated in an inclined state downward to right (see the arrow Y1 in FIG. 3) of the joint member 24 (see two-dot chain line 26 in FIG. 3).

Subsequently, the pump unit 26 is inserted in the opening 13 of the fuel tank 10 from its top while the fuel supply device 20 is still in its extended state. The pump unit 26 is mounted on the bottom wall 12 of the fuel tank 10 by being rotated relative to the joint member 24 in a direction opposite to that of being suspended (see the arrow Y2 in FIG. 3) so as to be placed horizontally (see FIG. 2). Further, a rotation limiting mechanism for limiting rotation beyond the horizontal state of the pump unit 26 is provided between the joint member 24 and the pump unit 26.

The standoff portion 41 of the flange main body 28 is then fitted in the opening 13 of the fuel tank 10 as the flange unit 22 is pressed downward against the biasing force of the coil spring 52. In this state, the flange portion 34 of the flange main body 28 is fixed to the upper wall 11 of the fuel tank 10 via fixing means (not shown), such as metal fixtures or bolts (see FIG. 2 and FIG. 3), thereby completing the installation of the fuel supply device 20 to the fuel tank 10.

The pump unit 26 is biased against the bottom wall 12 of the fuel tank 10 due to the biasing force of the coil spring 52 in the installed state of the fuel supply device 20 (see FIG. 2 and FIG. 3). Further, the projections 81 on the cover member 68 abut the bottom wall 12 of the fuel tank 10, thereby ensuring flow of fuel between the cover member 68 and the bottom wall 12. Further, a lower end face 41a of the standoff portion 41 of the flange unit 22 faces the upper end face 46a of the joint main body 46 with a predetermined distance therebetween (see FIG. 3).

Incidentally, the fuel tank 10 may deform, i.e., expand or contract in response to a change in the internal of the tank 10 pressure caused by a change in temperature or a change in the amount of fuel. Consequently, the distance between the upper wall 11 and the bottom wall 12 of the fuel tank 10 may vary (increase or decrease). In this case, the flange unit 22 and the joint member 24 move in the upward/downward direction so as to follow the change in the height of the fuel tank 10. Further, when the fuel tank 10 attempts to excessively contract, the standoff portion 41 of the flange main body 28 and the joint main body 46 come in contact with each other so as to serve as a tension rod.

A fuel feed pipe leading to an engine is connected to the fuel outlet port 37 of the flange unit 22. External connectors leading to a power source (e.g., ECU, etc.), are connected to the first electric connector portion 38 or the second electric connector portion 39. Still further, a fuel vapor piping member leading to a canister is connected to the evaporation port 36. The canister includes adsorbents (for example, activated carbon) for adsorbing and desorbing fuel vapor generated within the fuel tank 10.

The fuel pump 58 is driven by an external drive power source. The fuel from the interior of the fuel tank 10 that is to pass through the cover member 68 and/or fuel within the fuel storage space 79 of the pump unit 26 is drawn in by the fuel pump 58 via the fuel filter 67 and pressurized. The pressurized fuel discharged from the fuel pump 58 flows into the regulator case 64 via the discharge pipe portion 96 of the pump case 60, and the pressure of the fuel is regulated by the pressure regulator 62. The pressurized fuel having a regulated pressure is supplied to the engine through the fuel outlet port 37 of the flange unit 22 via the discharge fuel pipe 124.

The surplus fuel resulting from regulation of the fuel pressure using the pressure regulator 62 is discharged through the discharge pipe portion 118 at the regulator case 64 into the fuel receiving tubular portion 71 of the sub-tank main body 66. Further, a portion of the pressurized fuel discharged from the fuel pump 58 into the discharge pipe portion 96 of the pump case 60 is discharged into the fuel receiving tubular portion 71 of the sub-tank main body 66 via the fuel discharge tube 107. The fuel vapor generated in the fuel tank 10 is discharged into the canister when a fuel vapor control valve of the fuel vapor valve 30 opens.

Figure 6:
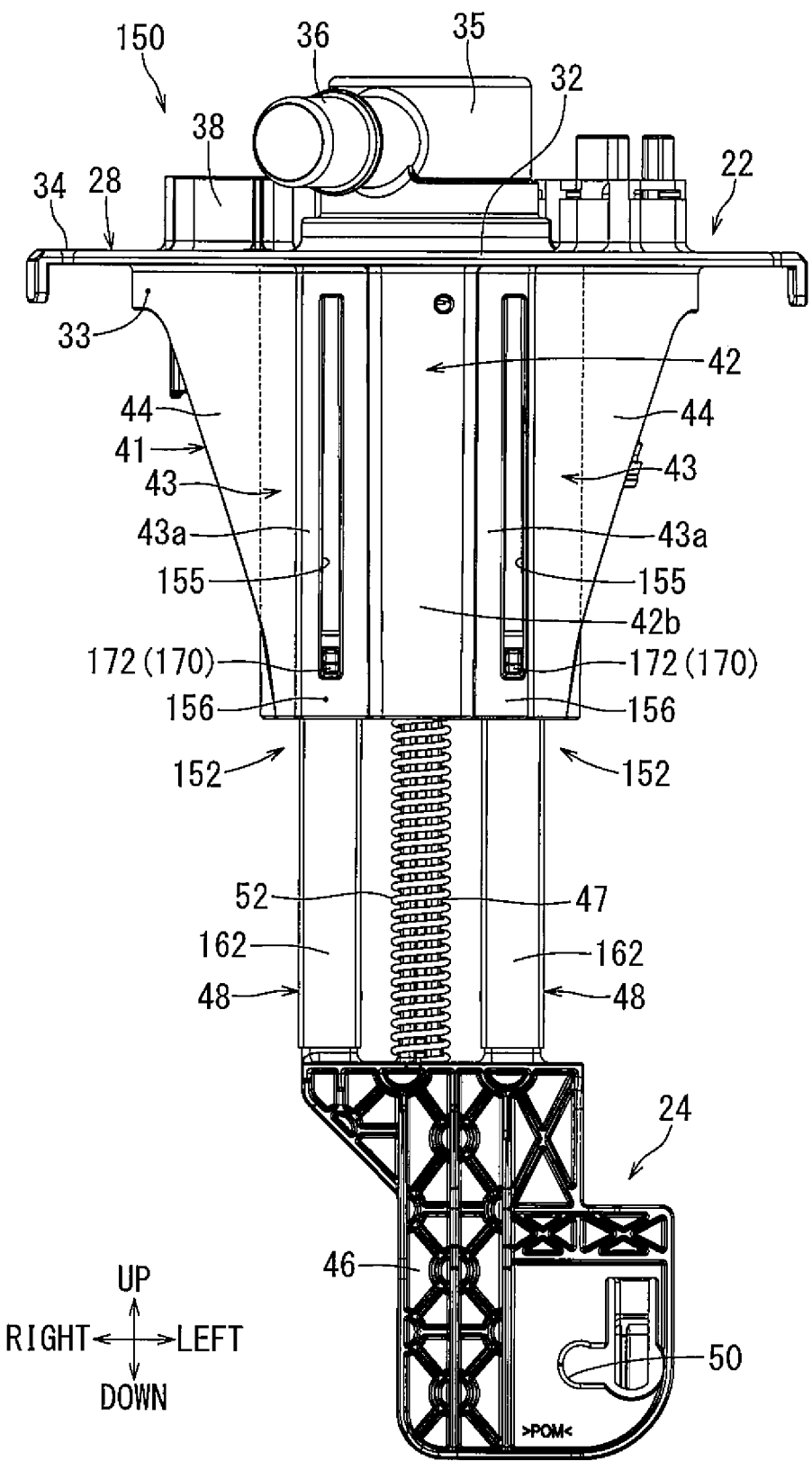
FIG. 6 is a rear view of the cover of FIG. 1 with a joint member in a suspended state.
Figure 7:
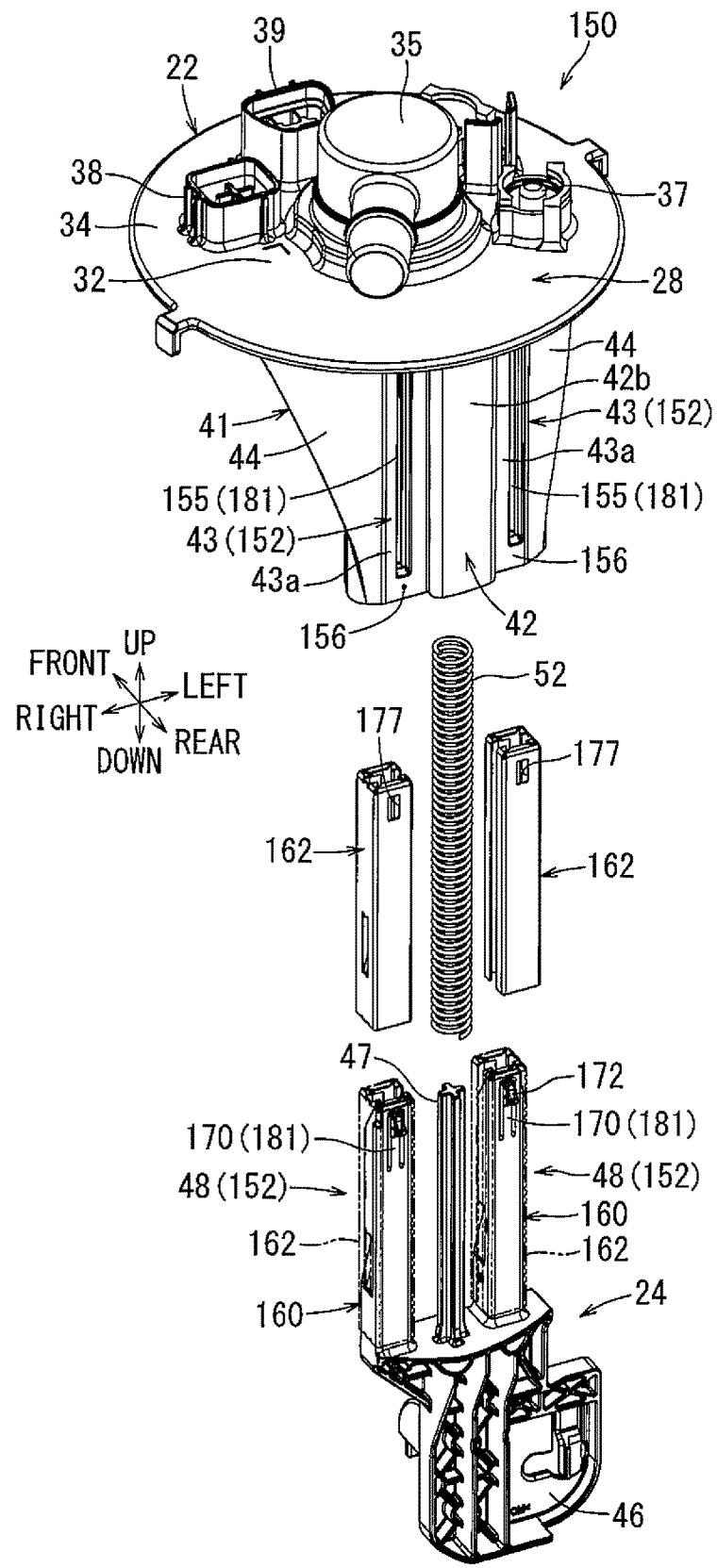
FIG. 7 is a perspective, exploded view of the cover of FIG. 1.

FIG. 6 is a rear view of the cover 150 for the fuel tank 10 with the joint member 24 in a suspended state. FIG. 7 is a perspective, exploded view of the fuel tank 10. As shown in FIG. 6, a fuel tank cover 150 includes the flange unit 22, the joint member 24, and the coil spring 52. Further, telescopic connecting structures 152 includes the side tubular portions 43 of the flange unit 22 and the side columnar portions 48 of the joint member 24. Further, since the left and right telescopic connecting structures 152 are generally the same, the left telescopic connecting structure 152 will be described in detail while the right telescopic connecting structure 152 will be described briefly or will not be described.

The flange unit 22 corresponds to the "cover member" in the present description. In addition, the joint member 24 corresponds to the "connecting member" in the present description. Further, the joint member 24 and the pump unit 26 correspond to the "in-tank component" in the present description. Still further, the joint main body 46 corresponds to a "connecting member main body" in the present description. Moreover, the center tubular portion 42 and the side tubular portions 43 correspond to the "tubular portions" in the present description.

Figure 8:
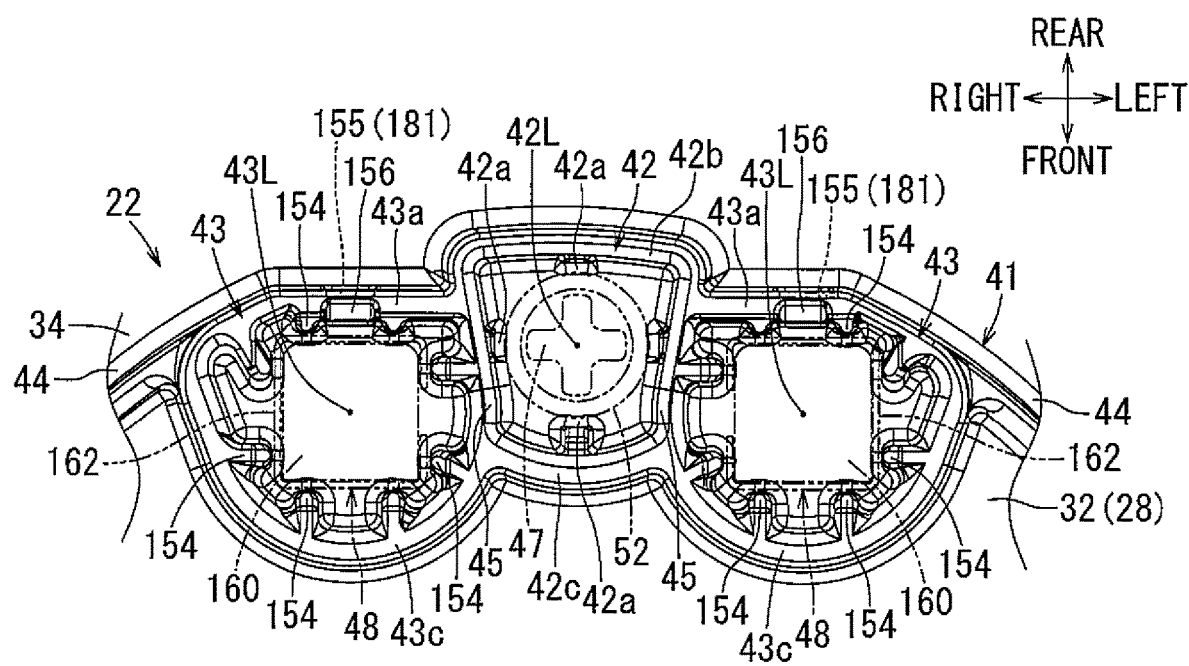
FIG. 8 is a bottom view of the flange unit of FIG. 7 illustrating peripheral parts of the side tubular portions.

FIG. 8 is a bottom view illustrating peripheral parts of the side tubular portions 43 of the flange unit 22. As shown in FIG. 8, the side tubular portions 43 have a substantially cylindrical shape in a bottom view of the flange unit 22. A plurality of guiding ribs 154 project from an inner surface of the side tubular portions 43. In the embodiment shown in FIG. 8, eight guiding ribs 154 are provided. The guiding ribs 154 extend linearly in the axial direction of the side tubular portions 43 (i.e., in the upward/downward direction, and in the direction of the front and rear sides of the sheet in FIG. 8). The guiding ribs 154 are circumferentially spaced and positioned at predetermined circumferential locations along the inner surface of the side tubular portions 43. Two adjacent guiding ribs 154 are formed in one set so as to abut on or to be proximal to two sides of each of projecting corner of the side columnar portions 48. It should be noted that the guiding ribs 154 correspond to the "rib-like portions" and the "slide guide ribs" in the present description.

As shown in FIG. 6, elongated engagement holes 155 extending in the upward/downward direction are provided on rear side walls 43a of the side tubular portions 43. Edges on the lower end sides of the engagement hole portions 155 may also be referred to herein as hole lower edge portions 156.

As shown in FIG. 8, the center tubular portion 42 is formed in a substantially rectangular columnar shape and is positioned between the side tubular portions 43. A plurality of (four front, rear, left, and right in FIG. 8) spring guiding ribs 42a are disposed along the inner surface of the center tubular portion 42. The spring guiding ribs 42a extend linearly (i.e., straight) in the axial direction of the center tubular portion 42 (i.e., upward/downward direction). The spring guiding ribs 42 are circumferentially spaced and positioned at predetermined circumferential locations along the inner surface of the center tubular portion 42. The center tubular portion 42 and both side tubular portions 43 may be made of resin so as to be integrally formed with the flange main body 28. It should be noted that the spring guiding ribs 42a correspond to the "rib-like portions" in the present description. A connecting structure of the center tubular portion 42 and both side tubular portions 43 will be described in more detail below.

Figure 9:
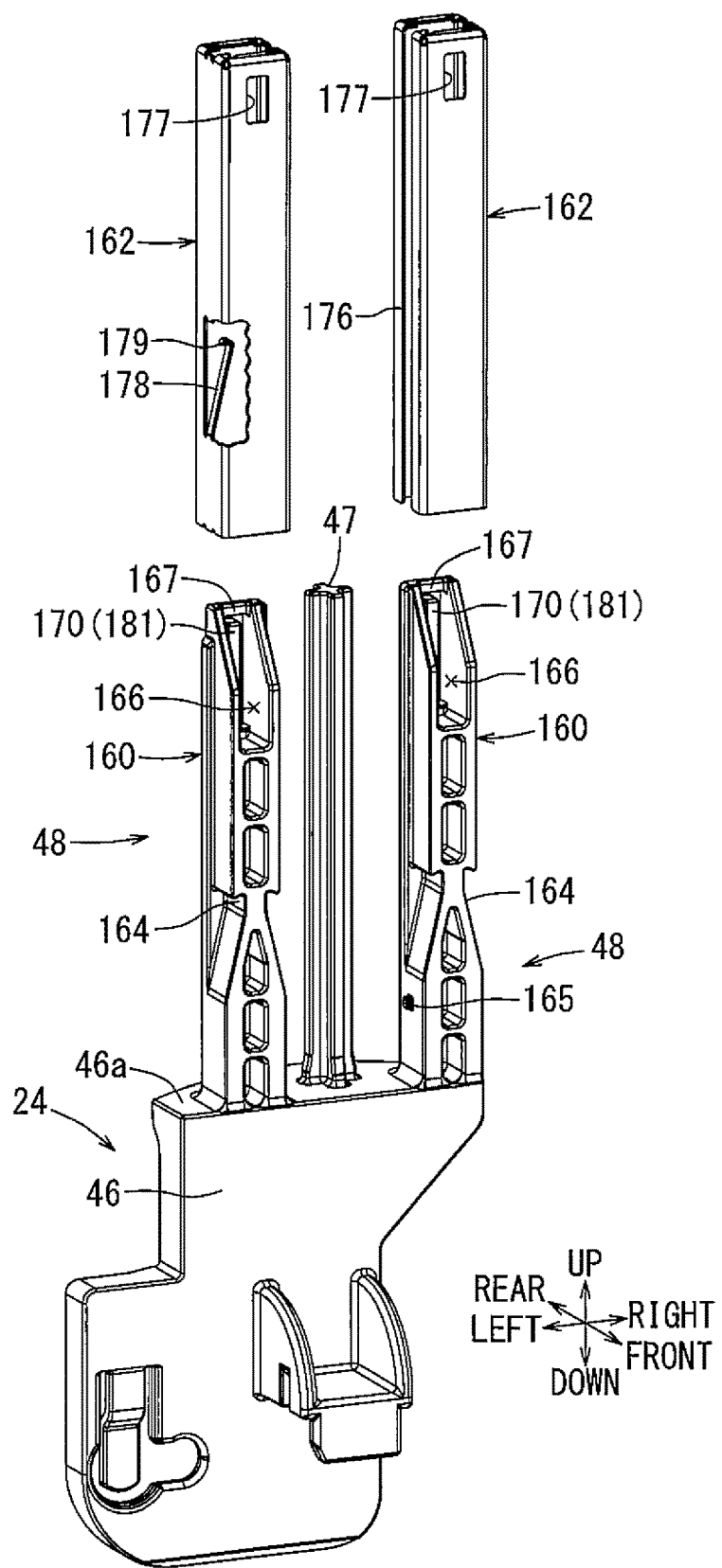
FIG. 9 is a perspective, exploded view of the joint member of FIG. 6.

FIG. 9 is a perspective, exploded view of the joint member 24. As shown in FIG. 9, the spring guide 47 extends upward from the center of the upper end face 46a of the joint main body 46. The spring guide 47 has a plus (+) shape in a plan view (see FIG. 8).

Figure 10:
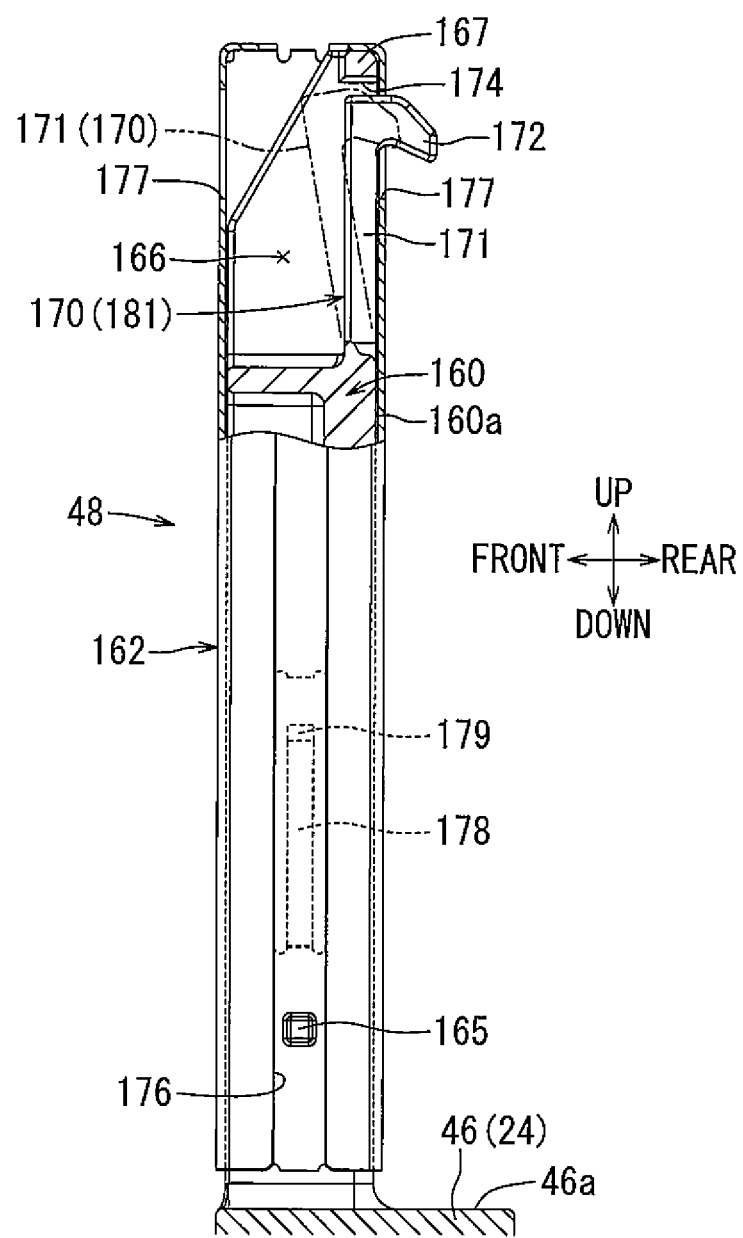
FIG. 10 is a side, partial cutaway view of one side columnar portion of FIG. 9.
Figure 11:
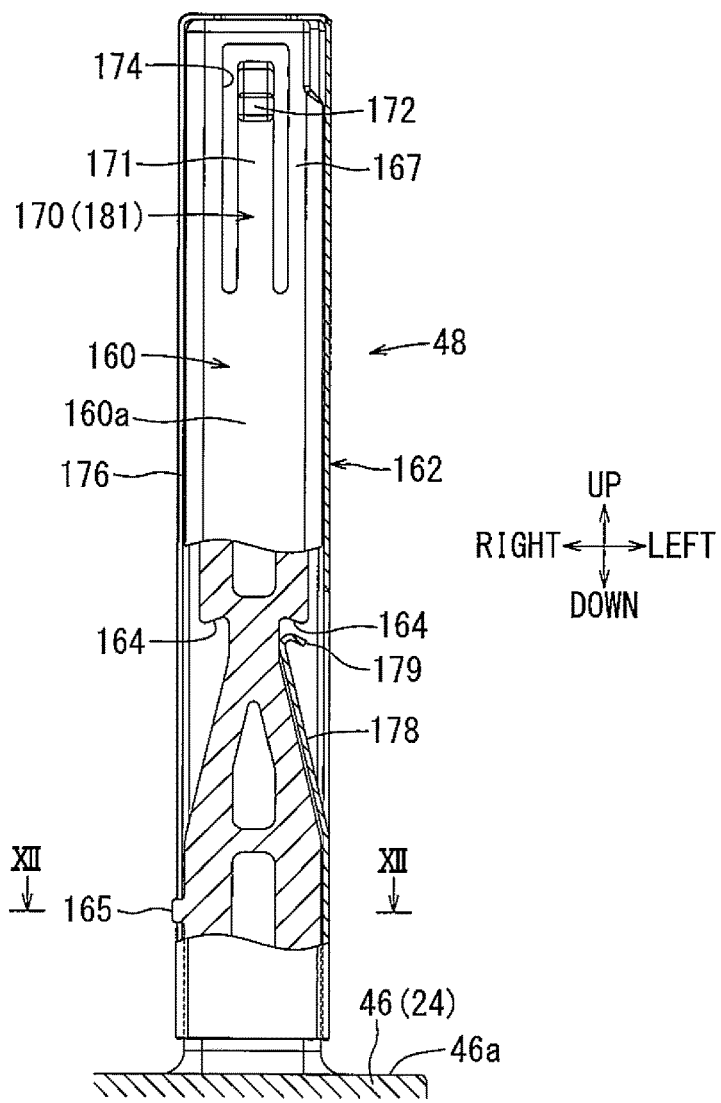
FIG. 11 is a rear, partial cutaway view of one side columnar portion of FIG. 9.
Figure 12:
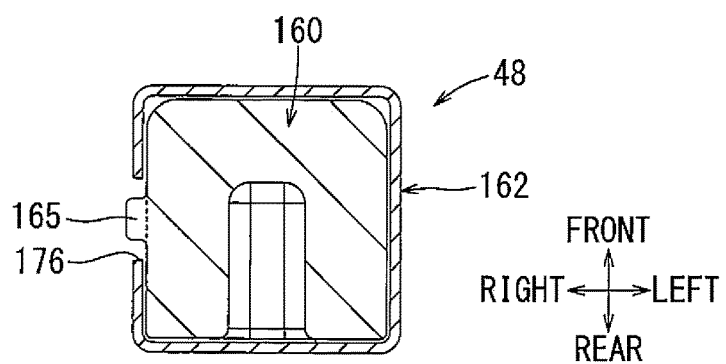
FIG. 12 is a cross-sectional view of the side columnar portion of FIG. 11 taken along line in FIG. 11.

As shown in FIG. 9, each side columnar portion 48 includes a support column portion 160 as a main body and a retainer 162 configured to cover an outer periphery of the support column portion 160. FIG. 10 is a side, partial cutaway view of the side columnar portion 48. FIG. 11 is a rear view of the side columnar portion 48. FIG. 12 is a cross-sectional view of the side columnar portion 48 taken along line in FIG. 11.

The support column portion 160 has a substantially square columnar shape on the joint main body 46 of the joint member 24. Substantially U-shaped lock grooves 164 are provided on the lower portion of both left and right sides of the support column portion 160 in a symmetrical manner in the rightward/leftward direction (see FIG. 11). Further, a rectangular alignment projection 165 located below the lock groove 164 extends from the lower end of the support column portion 160 (see FIG. 10). A recessed groove 166, which may have a rectangular shape with its front and top sides opened, is formed on the upper end of the support column portion 160. An engagement piece 170 is provided on a rear side wall 167 of the recessed groove 166 (see FIG. 10 and FIG. 11). It should be noted that the support column portion 160 corresponds to the "columnar portion" in the present description.

An outer surface of the support column portion 160 includes a left surface, a right surface, a front surface, and a rear surface, each of the foregoing surfaces being flat or planar. Collectively, the four flat surfaces of the support columnar portion 160 form a rectangular shape in a cross-section perpendicular to the axial direction. The four flat surfaces form straight lines in a cross-section perpendicular to the axial direction.

As shown in FIG. 10, the engagement piece 170 includes an engagement piece main body 171 extending upward and being cantilevered from the lower end side, and a hook-like engagement claw portion 172 formed on a tip end (upper end) of the engagement piece main body 171. A rear surface of the engagement piece main body 171 is coplanar with the rear surface 160a of the support column portion 160, including the rear side wall 167. The engagement claw portion 172 protrudes rearward from the rear surface of the rear side wall 167.

As shown in FIG. 11, the engagement piece main body 171 is formed by forming a substantially inverted U-shaped opening groove 174 in the rear side wall 167. The engagement piece main body 171 is elastically deformable, i.e., flexibly deformable in an engagement releasing direction of the engagement claw portion 172, i.e., in the direction entering the recessed groove 166 (forward direction) (see two-dot chain line 171 in FIG. 10). Further, the spring guide 47 and the support column portion 160 may be made of resin so as to be formed integrally with the joint main body 46.

As shown in FIG. 9, the retainers 162 have a substantially square tubular shape and may be formed by bending a metal (for example, stainless steel) plate material by press molding. The respective outer surfaces of the retainers 162 may have a similar shape to the outer surface of the support column portions 160 (see FIG. 12). In particular, in this embodiment, the respective outer surfaces of each retainer 162 includes a left surface, a right surface, a front surface, and a rear surface, each of the foregoing surfaces being flat. Collectively, the four flat surfaces form a rectangular shape in a cross-section perpendicular to the axial direction of the retainer 162. The four flat surfaces form straight lines in a cross-section perpendicular to the axial direction.

The retainers 162 are formed so as to be fitted onto the support column portions 160. A counter recess 176 extending in the axial direction from the center of the inner side plate at a predetermined width is positioned between both circumferential end edges of the retainer 162 (see FIG. 12). The counter recess 176 is sized and position to align, mate with, and receive the alignment projection 165 on the corresponding support column portion 160.

A window hole 177 having rectangular shapes is formed in the center of the upper end of the side plate of each retainer 162 adjacent to the side plate including the counter recess 176 (see FIG. 10). A locking piece 178 is formed at the lower portion of the side plate of each retainer 162 on the side opposite to the counter recess 176 and is formed in an obliquely cut and raised manner in the retainer 162 (see FIG. 11). The locking piece 178 is formed in a cantilever manner with a lower end as a base end and an upper end defining a locking end 179. The locking end 179 is bent so as to be folded back to the opposite side to the cut and raised direction. Further, the upper end of the retainer 162 is bent such that the upper end opening is narrowed.

As shown in FIG. 10, the retainer 162 is slid over the support column portion 160. At this moment, when the counter recess 176 of the retainer 162 is aligned with the alignment projection 165 of the support column 160, the alignment projection 165 can move into and within the counter recess 176, thereby completing the fitting of the retainer 162 onto the support column portion 160 (see FIG. 10 to FIG. 12). The outer periphery of the support column portion 160 is covered by the retainer 162 once the fitting of the retainer 162 is complete. Furthermore, the retainer 162 is aligned in the frontward/rearward direction as well as the leftward/rightward direction with respect to the support column portion 160.

However, if the counter recess 176 of the retainer 162 does not align with the alignment projection 165, the retainer 162 will interfere with the alignment projection 165 of the support column 160, thereby preventing the retainer 162 from being fitted onto the support column portion 160. This generally prevents the retainer 162 from being incorrectly assembled with the support column portion 160. In the case of incorrect assembly, the retainer 162 can be reassembled to the support column portion 160. The counter recess 176 of the retainer 162 is positioned on the inside the support column portion 160 (on the side of the spring guide 47) (see FIG. 9). As a result, the retainer 162 is prevented from being expanded and deformed due to an external force exerted from outside in the leftward/rightward direction in the event of a vehicle collision etc., thereby reducing the likelihood of breakage of the support column portion 160.

When the retainer 162 is fitted on the support column portion 160, the engagement claw portion 172 of the engagement piece 170 is pushed back to the side of the recessed groove 166 via the elasticity of the engagement piece 170 by the lateral side of the retainer 162. These components are structured such that the engagement piece 170 is elastically restored when the fitting of the retainer 162 is complete. As a result, the engagement claw portion 172 of the engagement piece 170 projects rearward through the window hole 177 (see FIG. 10).

Further, when the retainer 162 is fitted to the support column portion 160, the locking piece 178 is pushed back by the lateral side of the support column portion 160 utilizing the elasticity. The locking piece 178 is elastically restored when the fitting of the retainer 62 is completed, so that the locking end 179 of the locking piece 178 is locked in the lock groove 164 (see FIG. 11). As a result the retainer 162 is prevented from detaching from the support column portion 160. It should be noted that a snap fit for mounting the retainer 162 to the support column portion 160 is formed by the lock groove 164 and the locking piece 178 having the locking end 179.

The spring guide 47 fitted with the coil spring 52 is inserted in the center tubular portion 42 (see FIG. 8). The spring guide 47 abuts or comes close to an inner peripheral surface of the coil spring 52. Further, the spring guiding ribs 42a abuts or comes close to the outer peripheral surface of the coil spring 52. The coil spring 52 can be held in a vertical manner by the spring guide 47 and the spring guiding ribs 42a.

Figure 13:
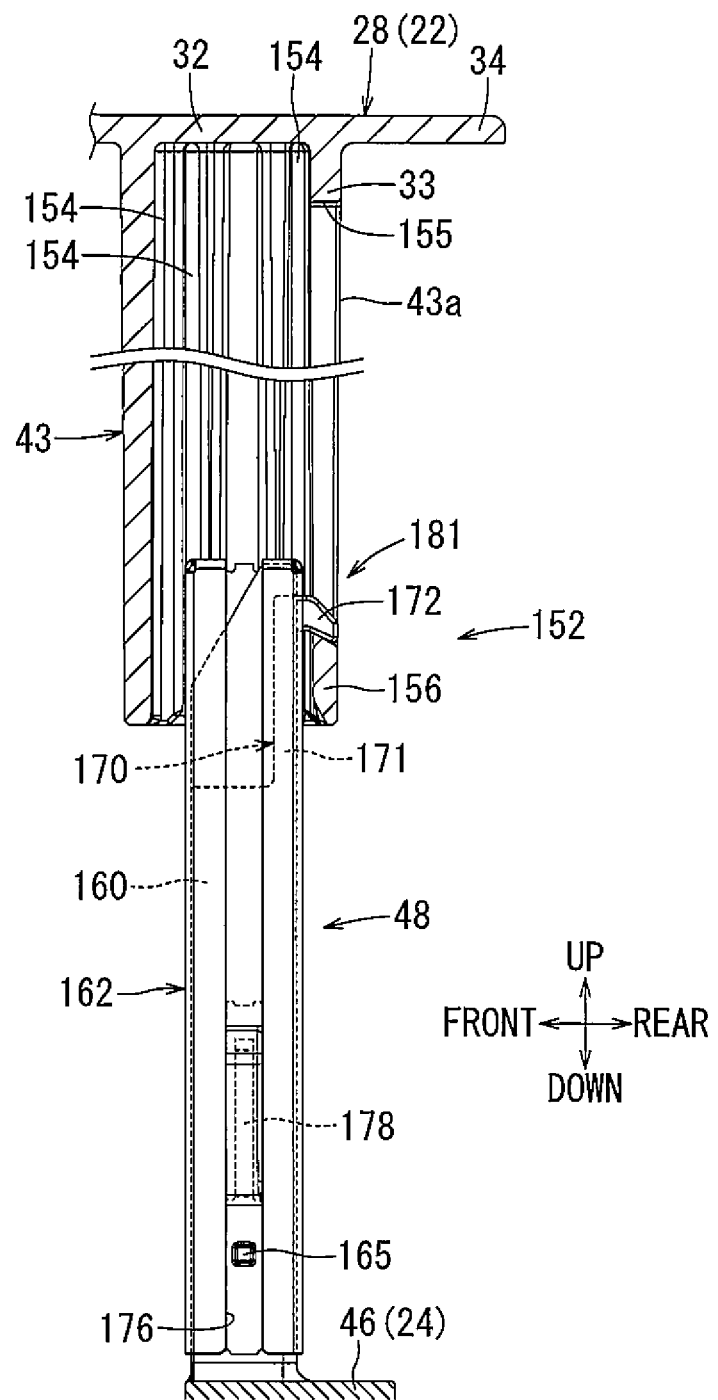
FIG. 13 is a side, partial cutaway view of one side columnar portion and corresponding side tubular portion in the suspended state.

As shown in FIG. 13, the side columnar portion 48 is inserted into the side tubular portion 43 from the bottom. At this moment, the engagement claw portion 172 of the engagement piece 170 interferes with the hole lower edge portion 156 of the engagement hole 155 of the side tubular portion 43, and then moves over the hole lower edge portion 156 utilizing the elastic deformation (flexible deformation) of the engagement piece 170. Accordingly, the engagement claw portion 172 engages with the engagement hole 155 of the side tubular portion 43 so as to be movable within a predetermined range in the upward/downward direction. More specifically, the side columnar portion 48 is connected to the side tubular portion 43 so as to be movable and suspendable in the upward/downward direction. Further, the side columnar portion 48 is coaxially aligned with and held to the side tubular portion 43 as the respective guiding ribs 154 in the side tubular portion 43 slidingly engage (or are at lease proximal) to the lateral sides of each of the projecting corners of the retainer 162 of the side columnar portion 48.

The guiding ribs 154 slidably guide the support column portion 160 in the axial direction (i.e. upward/downward direction). Two guiding ribs 154 are respectively disposed in positons facing the respective flat surfaces of the retainer 162. The guiding ribs 154 facing the flat surface are disposed in positions facing both end portions of the flat surface.

The engagement claw portion 172 of the engagement piece 170 of the support column portion 160 abuts the hole lower edge 156 of the engagement hole 155 of the side tubular portion 43 when the joint member 24 is suspended by the flange unit 22. This prevents the joint member 24 from detaching from the flange unit 22 in the suspended state. It should be noted that a suspension snap fit 181 configured to movably and suspendably connect the support column portion 162 to the side tubular portion 43 in the upward/downward direction is formed by the engagement hole 155 and the engagement piece 170 having the engagement claw 172. Further, the engagement claw 172 of the engagement piece 170 is formed such that the tip end thereof does not protrude from the rear surface of the side tubular portion 43.

As shown in FIG. 8, in this embodiment, opposite ends of the rear side walls 43a of both side tubular portions 43 of the flange main body 28 are connected to each other via the rear side wall 42b of the center tubular portion 42. In addition, in this embodiment, opposite ends of the front side walls 43c of both side tubular portions 43 are connected to each other via a front side wall 42c of the center tubular portion 42. Specifically, the rear side wall 42b of the center tubular portion 42 is positioned between the opposite ends of the rear side walls 43a of both side tubular portions 43. Further, the front side wall 42c of the center tubular portion 42 is positioned between the opposite ends of the front side wall 43c of both side tubular portions 43. It should be noted that the rear side wall 42b and the front side wall 42c of the center tubular portion 42 correspond to the "connecting portion" and the "bridge portion" in this description.

The center tubular portion 42 and each side tubular portion 43 of the flange main body 28, which are adjacent to one another, are connected to each other via a common wall portion 45 sharing opposite wall portions thereof. It should be noted that the common wall portion 45 corresponds to the "connecting portion" in the present description.

The rear side wall 42b of the center tubular portion 42 is disposed in a position stepped back rearward from the rear side walls 43a of both side tubular portions 43. Further, the outer (opposite to the center tubular portion 42) wall portions of the rear side walls 43a of both side tubular portions 43 are inclined obliquely forward. The outer ends of the rear side walls 43a of the side tubular portions 43 and the outer ends of the front walls 43c are connected to each other.

The front side wall 42c of the center tubular portion 42 is formed in a circular arc shape projecting in the radially outward direction (i.e., in the front direction). The front side wall 42c is formed in a circular arc shape about the axis 42L of the center tubular portion 42. It should be noted that the front side wall 42c corresponds to the "circular arc wall portion" in the present description.

The front side walls 43c of the side tubular portions 43 are formed in a circular arc shape projecting in the radially outward direction (i.e., in the frontward direction). The front side walls 43c are formed in a circular arc shape about the axes 43L of the side tubular portions 43. It should be noted that the front side wall portions 43c correspond to the "circular arc wall portions" in the present description.

According to the above-described fuel tank cover 150, the strength of both side tubular portions 43 located in a separated positional relationship can be enhanced since the opposing parts of both side tubular portions 43 of the flange main body 28 of the flange unit 22 are connected to each other via the rear side wall 42b and the front side wall 42c of the center tubular portion 42. As a result, it is possible to reduce and/or prevent the deformation of the flange main body 28 of the flange unit 22 due to an external force, for example, a vehicle collision.

The strength of the center tubular portion 42 and the side tubular portions 43, which are positioned adjacent or proximal each other, can be enhanced by the opposing parts of the center tubular portion 42 and the side tubular portions 43 of the flange main body 28 of the flange unit 22 that are connected to each other via the common wall portions 45. As a result, it is possible to reduce and/or prevent the deformation of the flange main body 28 of the flange unit 22 due to an external force, for, example, a vehicle collision.

Further, the stress concentration exerted on the center tubular portion 42 may be reduced since the front side wall 42c of the center tubular portion 42 is formed in a circular arc shape projecting in a radially outward direction. Furthermore, the stress concentration exerted on the center tubular portion 42 may be further reduced since the front side wall 42c of the center tubular portion 42 is formed in a circular arc shape about the axis 42L of the center tubular portion 42.

Still further, the stress concentrations in the side tubular portions 43 may be reduced since the front side walls 43c of the side tubular portions 43 are formed in a circular arc shape projecting in a radially outward direction. As a result, it is possible to reduce the deformation of the flange main body 28 of the flange unit 22 due to an external force, for example, a vehicle collision.

Still further, the stress concentration in the side tubular portions 43 may be further reduced since the front side walls 43c of the side tubular portions 43 are formed in a circular arc shape about the axes 43L of the side tubular portions 43.

Still further, the spring guiding ribs 42a extending in the axial direction along the inner surface of the center tubular portion 42 enhance the strength of the center tubular portion 42. Furthermore, at the center tubular portion 42 into which the coil spring 52 is disposed, the sliding resistance of the coil spring 52 with respect to the center tubular portion 42 may be reduced.

The guiding ribs 154 extending in the axial direction along the inner surfaces of the side tubular portions 43 enhance the strength of the side tubular portions 43. Further, at the side tubular portion 43 into which the support column portion 160 is inserted, the sliding resistance of the retainer 162 with respect to the side tubular portion 43 may be reduced.

According to the above-described telescopic connecting structure 152, the sliding resistance of the support column portions 160 with respect to the side tubular portions 43 can be reduced since the guiding ribs 154 slidably guide the support column portions 160 and reduce the contact areas between the side tubular portions 43 and the support column portions 160 while the support column portions 160 move relative the side tubular portions 43. The slidability of the support column portions 160 with respect to the side tubular portions 43 may thus be improved, thereby enabling the support column portions 160 to move and slide smoothly. Further, the strength of the side tubular portions 43 may be enhanced by the guiding ribs 154.

Further, since the guiding ribs 154 slidably contact the respective flat surfaces of the support column portions 160, the support column portions 160 can be more consistently and stably slidably guided as compared to the guiding ribs 154 contacting with non-flat surfaces.

Figure 14:
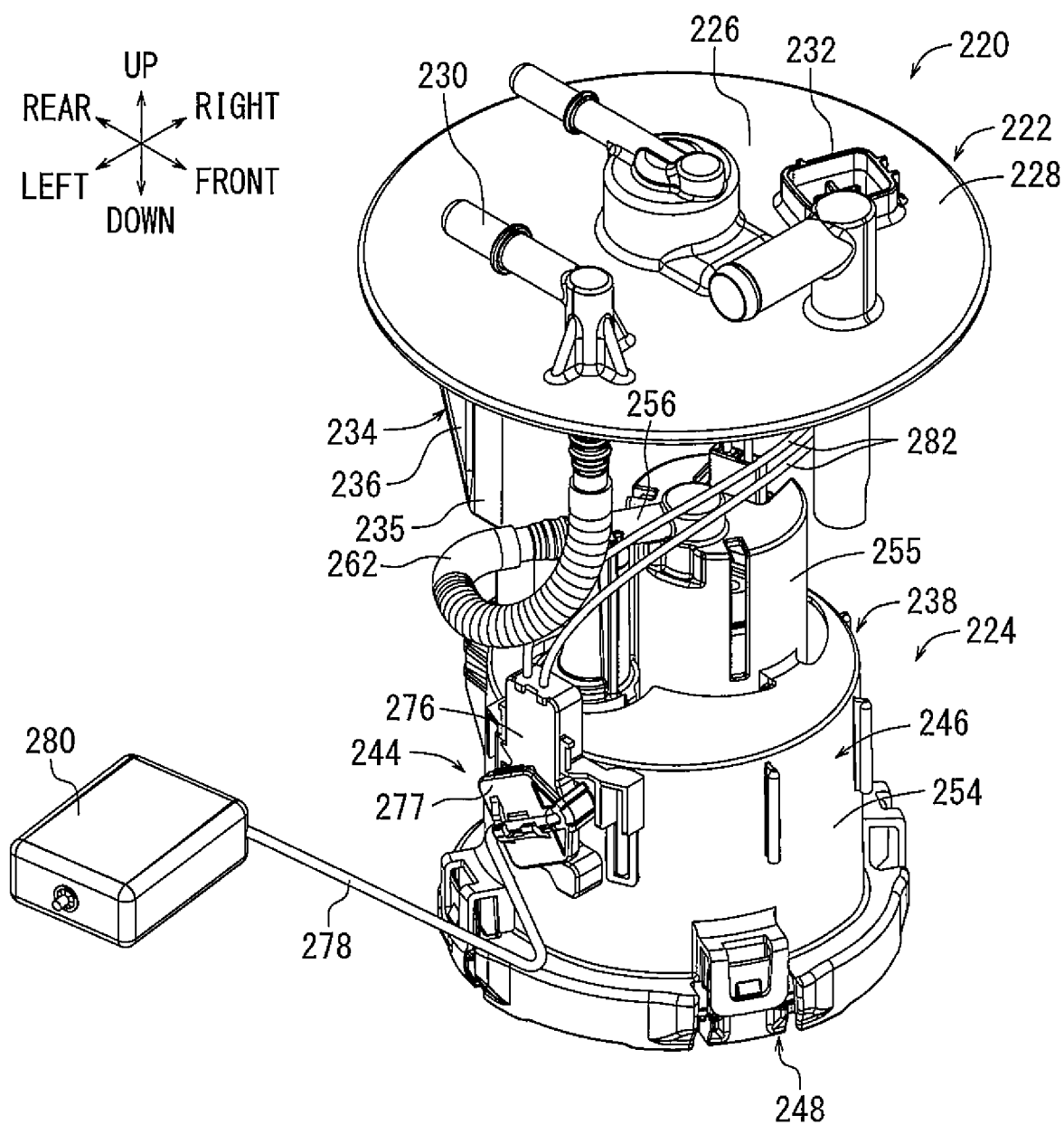
FIG. 14 is a perspective view of an embodiment of a fuel supply device according to a second embodiment.
Figure 15:
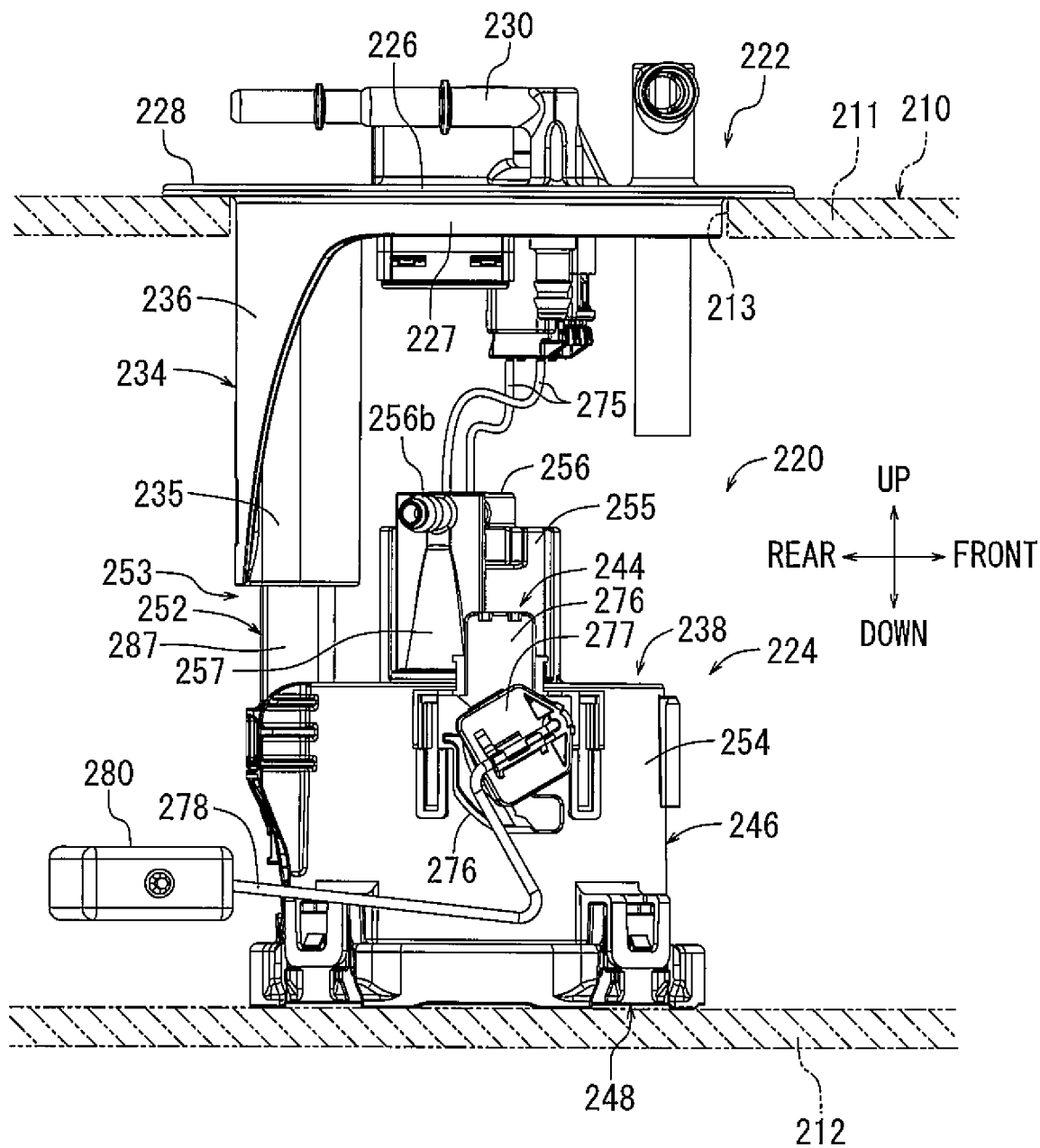
FIG. 15 is a side view of the fuel supply device of FIG. 14.
Figure 16:
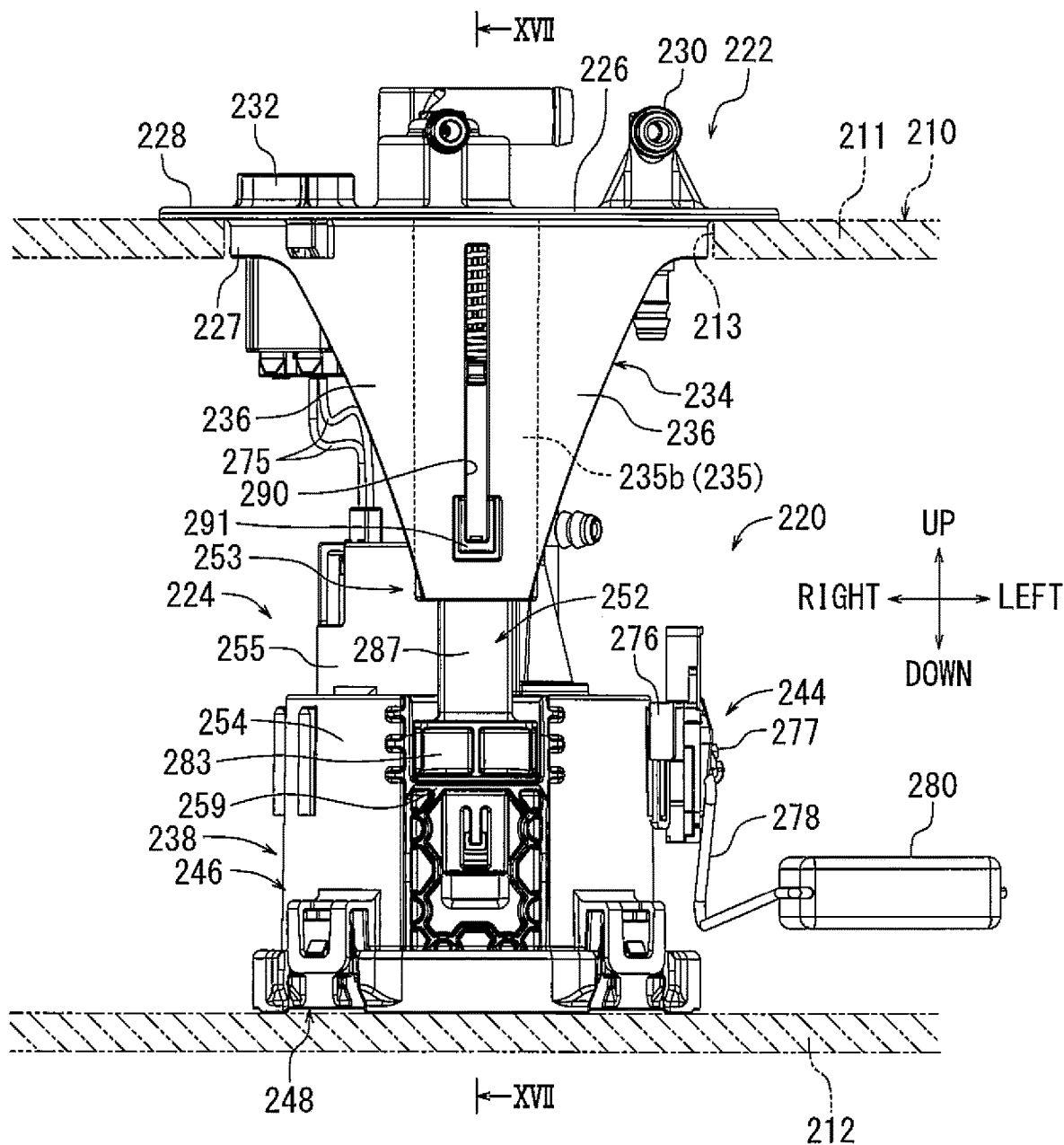
FIG. 16 is a rear view of the fuel supply device of FIG. 14.
Figure 17:
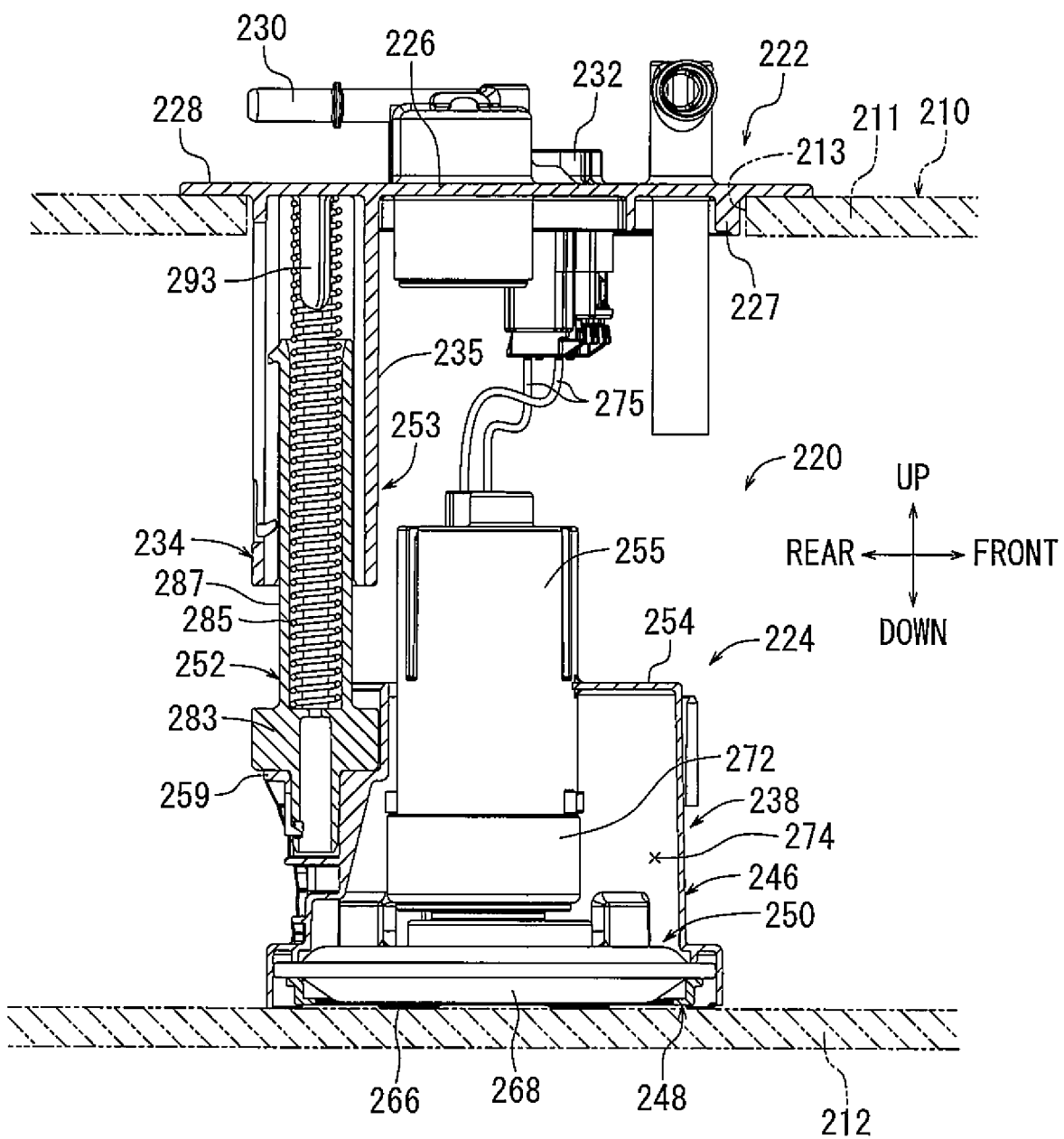
FIG. 17 is a cross-sectional view of the fuel supply device of FIG. 14 taken along line XVII-XVII in FIG. 16.
Figure 18:
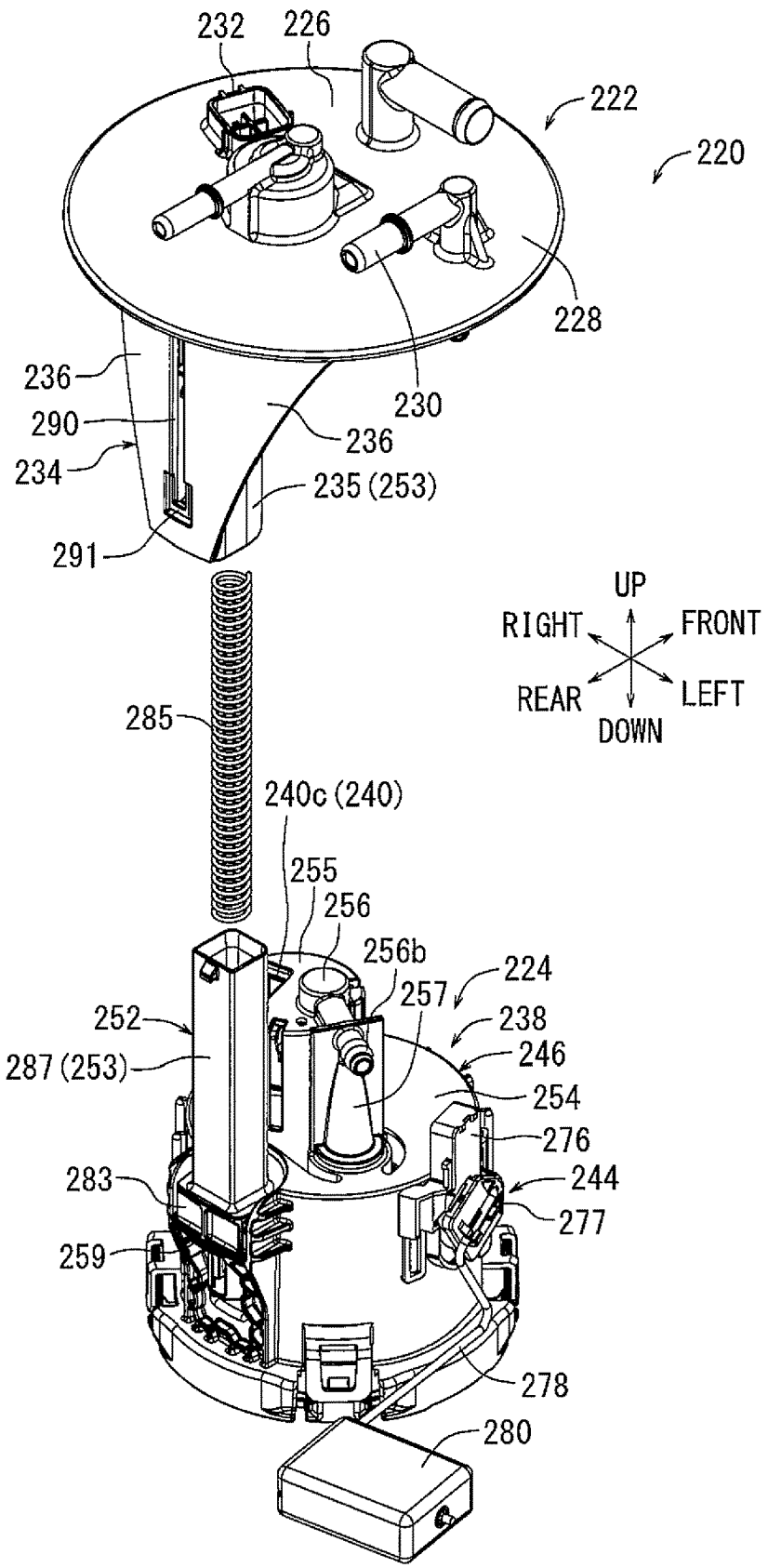
FIG. 18 is a perspective, exploded view of the cover member and the pump unit of FIG. 14.

Hereinafter, a second embodiment of a fuel supply device 220 having a telescopic connection structure will be described with reference to the drawings. The fuel supply device 220 is configured to be mounted on a vehicle (e.g., an automobile or the like), and serves to feed liquid fuel within the fuel tank to an internal combustion engine (i.e., an engine). FIG. 14 is a perspective view of the fuel supply device 220. FIG. 15 is a side view of the same. FIG. 16 is a rear view of the same. FIG. 17 is a cross-sectional view of the same, taken along line XVII-XVII in FIG. 16. FIG. 18 is an exploded perspective view of thea flange unit and a pump unit of the fuel supply device 220. The directions associated with the fuel supply device are determined as indicated by the arrows in the figures. The upward/downward direction corresponds to a gravity direction which is a so-called vertical direction when mounted to the fuel tank of the vehicle. Further, the frontward/rearward direction shall not be specified.

As shown in FIG. 15, a fuel tank 210 may be formed in a hollow container having an upper wall 211 and a bottom wall 212. The fuel tank 210 is made of resin and deforms, i.e., expands or contracts mainly in the upward/downward direction, in response to a change in tank internal pressure. An opening 213 formed as a circular hole may be formed in the upper wall 211. For example, gasoline as a liquid fuel may be stored in the fuel tank 210. The opening 213 corresponds to the "opening" in the present description.

As shown in FIG. 14, the fuel supply device 220 includes a flange unit 222 and a pump unit 224 (see FIG. 18).

The flange unit 222 comprises a cover plate 226 having a circular plate shape. The flange unit 222 may be made of resin, for example, a polyacetal resin (POM). As shown in FIG. 15, a short cylindrical fitting tubular portion 227 is concentrically formed on a lower surface of the cover plate 226. An annular disc-like flange portion 228 extends radially outward beyond the fitting tubular portion 227 at an outer periphery of the cover plate 226.

As shown in FIG. 14, a fuel outlet port 230 and an electric connector 232 is provided on the cover plate 226. The fuel outlet port 230 extends through the cover plate 226 in the upward/downward direction.

As shown in FIG. 16, a standoff portion 234 is provided on a rear side of the lower surface of the cover plate 226. The standoff portion 234 includes an outer tubular portion 235, a left curved 236, and a right curved wall portion 236 (see FIG. 18). The outer tubular portion 235 extends downward from the cover plate 226 and has a tubular shape extending in the upward/downward direction. The curved wall portions 236 are symmetrically formed on each side of the outer tubular portion 235. Both curved wall portions 236 have a substantially triangular shape, which is tapered downward from the fitting tubular portion 227 as viewed from the back. The rear side wall 235b of the outer tubular portion 235 and the upper ends of both curved wall portions 236 are connected to the fitting tubular portion 227 of the flange unit 222.

Figure 19:
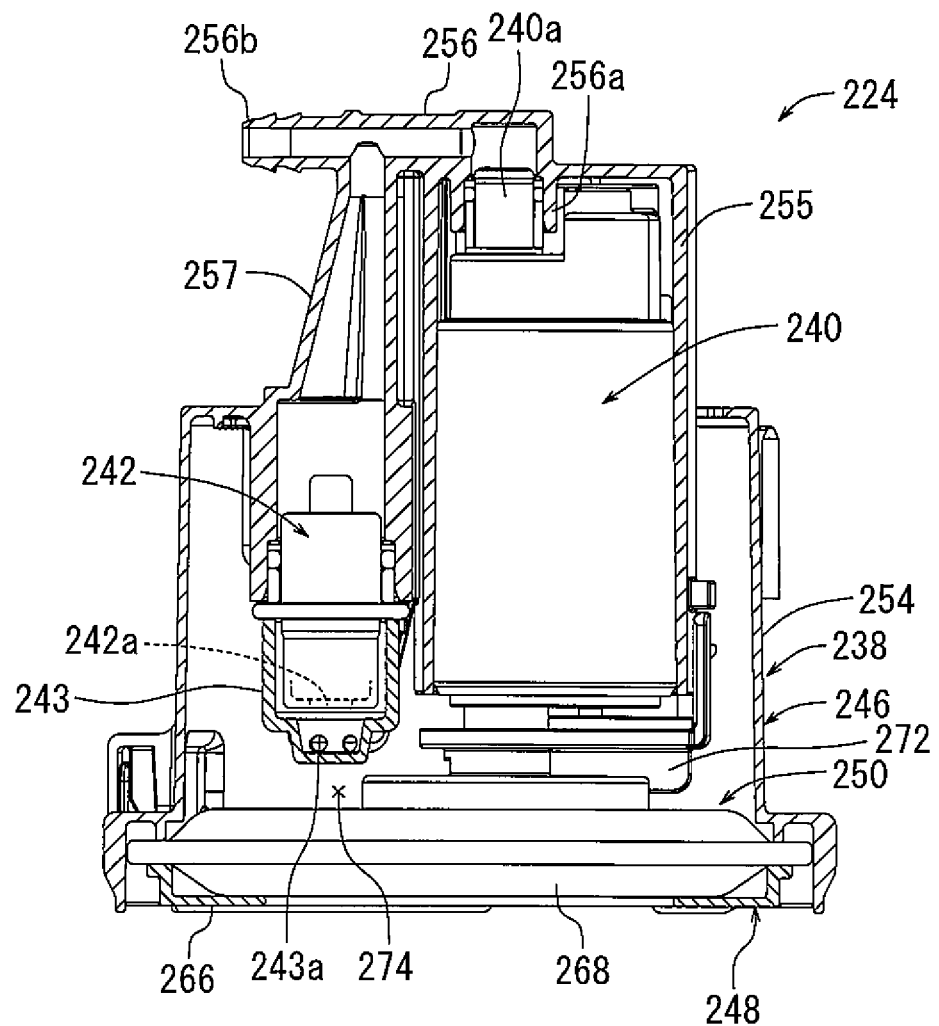
FIG. 19 is a cross-sectional view of the pump unit of FIG. 14.

FIG. 19 is a cross-sectional view of the pump unit 224. As shown in FIG. 19, the pump unit 224 includes a sub-tank 238, a fuel pump 240, and a pressure regulator 242. Further, the pump unit 224 includes a sender gauge 244 (see FIG. 18).

The sub-tank 238 includes a sub-tank main body 246, a lower cover 248, and a fuel filter 250. The sub-tank main body 246 includes a tank forming portion 254, a pump casing portion 255, a piping portion 256, and a regulator attaching pipe portion 257. The sub-tank main body 246 is made of resin, for example, a polyacetal resin (POM).

The tank forming portion 254 has a cylindrical shape with a closed top and an open bottom. As shown in FIG. 17, a support column attachment portion 259 is formed on an upper part of the rear end of the tank forming portion 254. A connecting support column 252 is attached to the support column attachment portion 259 (see FIG. 18).

As shown in FIG. 19, the pump casing portion 255 is integrally molded in the center of the top side of the tank forming portion 254. The pump casing portion 255 has a cylindrical shape with a closed top and an open bottom. An intermediate section of the pump casing portion 255 extends in the upward/downward direction from the top side of the tank forming portion 254.

The piping portion 256 may be integrally molded with the pump casing portion 255. In this embodiment, the piping portion 256 is formed as a straight tube extending from the top side of the pump casing portion 255 substantially to the left. The piping portion 256 has an inlet 256a, which is in fluid communication with the pump casing portion 255 at one end and an outlet 256b on the other end. The outlet 256b is connected to the fuel outlet port 230 via a piping member 262 (see FIG. 14).

The regulator attaching pipe portion 257 may be integrally molded with the tank forming portion 254. The regulator attaching pipe portion 257 has a pipe-shape extending in the upward/downward direction. An intermediate section of the regulator attaching pipe portion 257 extends in the upward/downward direction and is connected to the top side of the tank forming portion 254. An upper part of the regulator attaching pipe portion 257 has a conical tube shape with a passage having a cross-sectional area that gradually decreases moving upward from the top side of the tank forming portion 254. An upper end of the regulator attaching pipe portion 257 is in fluid communication with the axial center of the piping portion 256.

The lower cover 248 has a shallow round disc shape including a bottom plate portion 266 formed in a grid plate shape. The lower cover 248 is attached to the sub-tank main body 246 by snap-fitting so as to cover the bottom opening thereof. The lower cover 248 may be made of resin.

The fuel filter 250 includes a filter member 268 and a connection member 272. The filter member 268 has a hollow bag shape with a filter material made of a resin non-woven fabric. A contour of the filter member 268 has a substantially circular disc shape. An inner frame member is disposed in the filter member 268 for maintaining an interior volume of the filter member 268. The connection member 272 is disposed on the upper side of the filter member 268. The connection member 272 is joined to the inner frame member such that the inside and the outside of the filter member 268 are in fluid communication with each other. The connection member 272 and the inner frame member may be made of resin.

The filter member 268 is oriented substantially horizontally and closes a bottom side of the tank forming portion 254 before the lower cover 248 is attached to the tank forming portion 254. The connection member 272 is attached to the sub-tank main body 246 by snap-fitting. A fuel storage space 274 for storing fuel is defined between the sub-tank main body 246 and the top side of the fuel filter 250. A peripheral edge of the filter member 268 is interleaved between the sub-tank main body 246 and the lower cover 248 in a sealed manner by attaching the lower cover 248 to the sub-tank main body 246.

The fuel pump 240 may be an electric fuel pump having a substantially cylindrical shape. The fuel pump 240 is inserted in the pump casing portion 255 from the bottom before the connection member 272 is attached to the pump casing portion 255. Accordingly, a fuel discharge port 240a of the fuel pump 240 is connected to the inlet 256a of the piping portion 256. The fuel pump 240 is held in the pump casing portion 255 by attaching the connection member 272 to the pump casing portion 255 by snap-fitting. Accordingly, an interior space of the filter member 268 communicates with the fuel suction port of the fuel pump 240 via the connection member 272. The filter member 268 serves to filter fuel drawn into the fuel pump 240. The fuel pump 240 draws and pressurize fuel passed through the filter member 268, and discharges the pressurized fuel from the fuel discharge port 240a into the piping portion 256.

The pressure regulator 242 is attached within a lower end of the regulator attaching pipe portion 257. A retention member 243 made of resin, which serves to prevent the pressure regulator 242 from coming off, is attached to the lower end of the regulator attaching pipe portion 257 by snap-fitting. The pressure regulator 242 serves to regulate pressure in the piping portion 256, i.e., pressure of fuel supplied from the fuel pump 240 to an engine, at a predetermined pressure, and to inject surplus fuel from a surplus fuel discharge port 242a. The pressurized fuel injected out through the surplus fuel discharge port 242a is discharged into the fuel storage space 274 through an opening hole 243a formed in the retention member 243.

As shown in FIG. 18, the sender gauge 244 includes a gauge main body 276, an arm 278 and a float 280. The gauge main body 276 is attached to an outer side surface of the tank forming portion 254 of the sub-tank main body 246. A rotating portion 277 is attached to the gauge main body 276, and one end of the arm 278 is attached to the rotating portion 277. Thus, the arm 278 is rotatable about a horizontal axis relative to the gauge main body 276. The float 280 is attached to the other end of the arm 278. The sender gauge 244 is a liquid level meter configured to detect a residual amount of fuel in the fuel tank 210 (i.e., a position of the liquid level). The gauge main body 276 and the float 280 may be made of resin. The arm 278 may be made of metal.

As shown in FIG. 17, the connection strut 252 include a tubular column portion 287 having a hollow cylindrical shape. A pedestal 283 is provided at a lower end of the tubular column portion 287. The pedestal 283 is mounted on the strut attachment portion 259 of the sub-tank main body 246. The connection strut 252 is provided at the sub-tank main body 246 and vertically oriented. The connection strut 252 may be made of resin, for example, polyamide resin mixed with glass fibers (PA66+GF33).

The tubular column portion 287 are slidably fitted into the outer tubular portion 235 of the flange unit 222. The tubular column portion 287 is connected to the outer tubular portion 235 by snap-fitting that allows for suspension of the tubular column portion 287 from the outer tubular portion 235 and relative movement in an axial direction within a predetermined range. In other words, the pump unit 224 is connected to the flange unit 222 so as to be movable in the upward/downward direction within the predetermined range. The telescopic connecting structure 253 comprises the tubular column portion 287 and the outer tubular portion 235. The telescopic connecting structure 253 will be described in more detail below.

A cylindrical metal coil spring 285 is disposed in the outer tubular portion 235 and the tubular column portion 287. The coil spring 285 biases the tubular column portion 287 and the outer tubular portion 235 in opposite directions (i.e., away from each other). The tubular column portion 287 also functions as a guide for the coil spring 285.

An electric connector 240c (see FIG. 18) for the fuel pump 240 is electrically coupled to the electric connector 232 of the flange unit 222 via electric wires 275 (see FIG. 17). As shown in FIG. 14, the electric connector for the gauge main body 276 is electrically coupled to the electric connector 232 via electric wires 282.

For installing the fuel supply device 220 in the fuel tank 210, the pump unit 224 is in an extended state with the pump unit 224 suspended by the flange unit 222. Subsequently, the pump unit 224 is inserted in the fuel tank 210 through the opening 213 and placed on the bottom wall 212 of the fuel tank 210. At this moment, the lower end face of the sub-tank main body 246 abuts the upper side of the bottom wall 212 (see FIG. 17).

Subsequently, the flange unit 222 is pressed down against the biasing force of the coil spring 285 so that the flange portion 228 can be fixably attached to the upper wall 211 of the fuel tank 210 via fixing means, such as metal fixtures or bolts. At this time, the fitting tubular portion 227 is fitted to the opening 213, thereby closing the opening 213 of the fuel tank 210 and completing the installation of the fuel supply device 220 (see FIGS. 15 to 17).

In the installed state of the fuel supply device 220 (see FIG. 17), the sub-tank main body 246 of the pump unit 224 is biased against the bottom wall 212 of the fuel tank 210 by the coil spring 285. Further, a fuel feed pipe leading to an engine is connected to the fuel outlet port 230 of the flange unit 222. Furthermore, an external connector leading to power source, ECU or the like, is connected to the electric connector 232.

The fuel pump 240 is driven by an external drive power source. The fuel in the fuel tank 210 and/or the fuel in the fuel storage space 274 of the sub-tank 238 is then drawn into the fuel pump 240 through the fuel filter 250 and pressurized. The pressure of the pressurized fuel delivered from the fuel pump 240 into the piping portion 256 of the sub-tank main body 246 is regulated by the pressure regulator 242. The pressure-regulated pressurized fuel is supplied to the engine from the fuel outlet port 230 of the flange unit 222 via the piping member 262.

The fuel tank 210 may deform, i.e., expand or contract, in response to a change in tank internal pressure caused by a change in temperature or a change in the amount of fuel etc. Consequently, the distance between the upper wall 211 and the bottom wall 212 of the fuel tank 210 varies (increases or decreases). The flange unit 222 and the pump unit 224 can move relative to each other in the upward/downward direction so as to follow the change in height of the fuel tank 210.

When the fuel tank 210 attempts to excessively contract, the standoff portion 234 of the flange unit 222 comes in contact to the pedestal 238 of the connection strut 252 of the pump unit 224 so as to serve as a tension rod. Consequently, the distance between the flange unit 222 and the sub-tank main body 246 is limited to this minimum distance.

Figure 20:
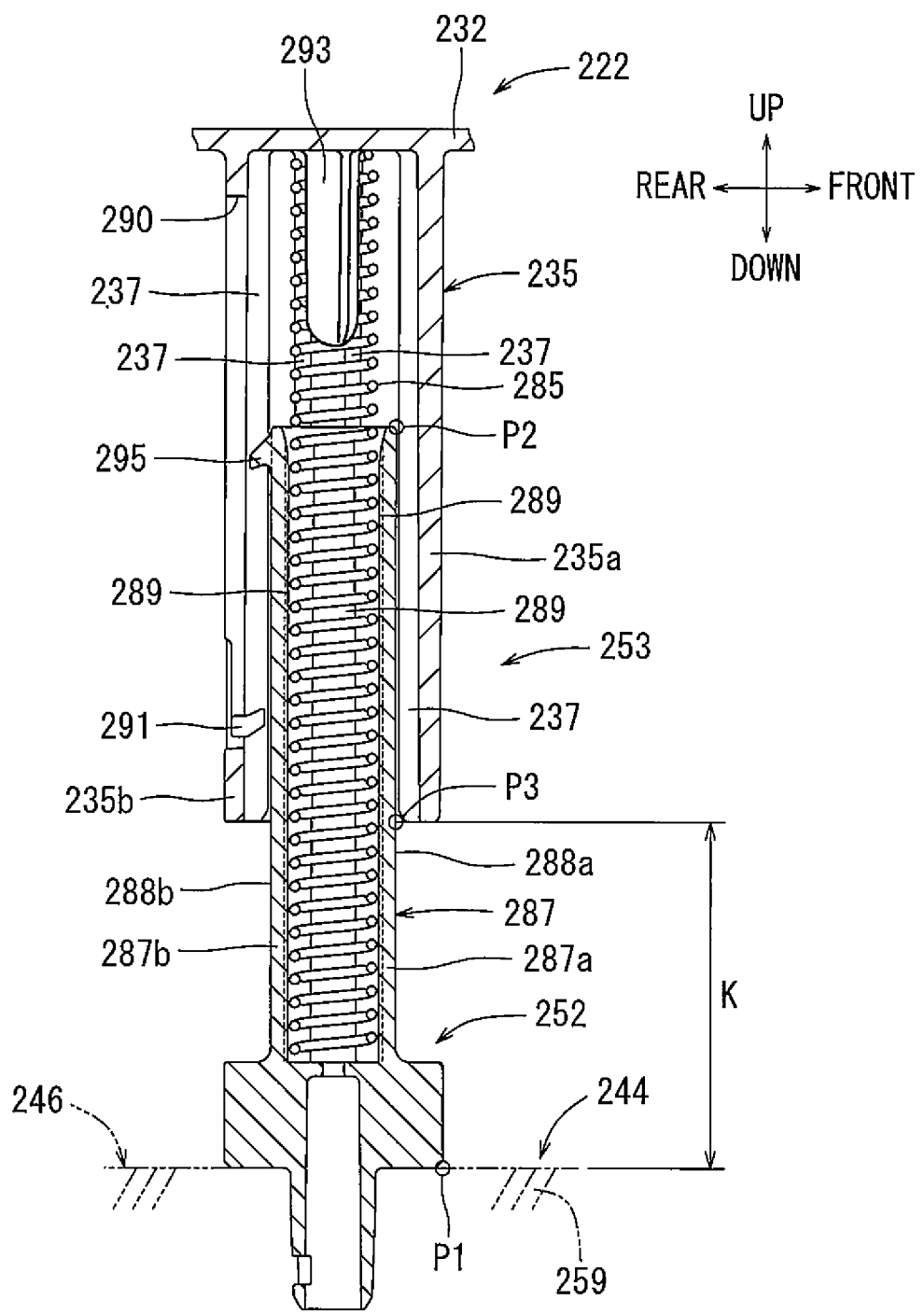
FIG. 20 is a lateral cross-sectional view of the telescopic connecting structure of FIG. 14.
Figure 21:
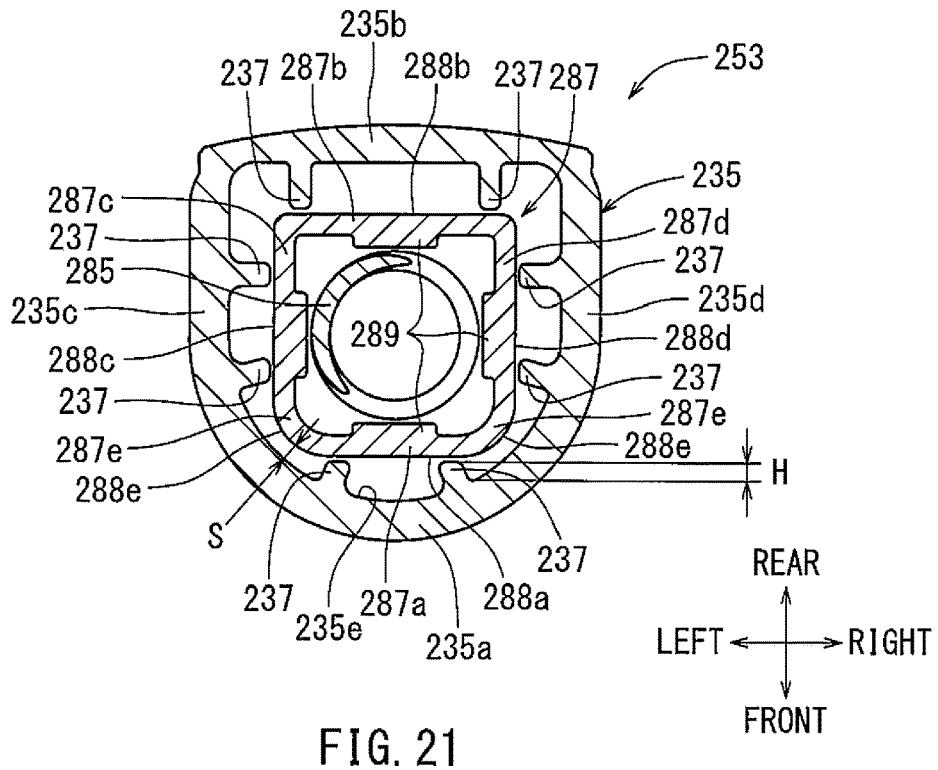
FIG. 21 is a sectional plan view of the telescopic connecting structure of FIG. 20.

As shown in FIG. 17, the telescopic connecting structure 253 comprises the outer tubular portion 235 on the side of the flange unit 222 and the tubular column portion 287 of the connection strut 252 on the side of the pump unit 224. FIG. 20 is a lateral cross-sectional view of the telescopic connecting structure 253. FIG. 21 is a sectional plan view of the same. It should be noted that the flange unit 222 corresponds to the "cover member" in the present description. In addition, the connection strut 252 corresponds to the "connecting member" in the present description. Further, the pump unit 224 corresponds to the "in-tank component" in the present description. Still further, the outer tubular portion 235 corresponds to the "tubular portion" in the present description. Moreover the tubular column portion 287 corresponds to the "columnar portion" and the "inner tubular portion" in the present description.

Figure 23:
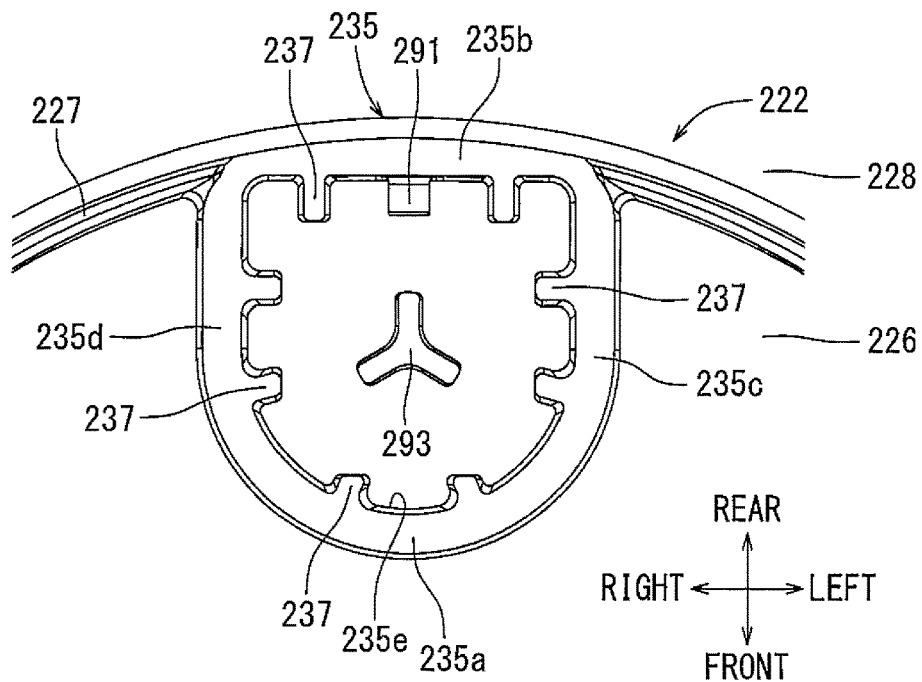
FIG. 23 is a bottom view of the tubular portion of the flange unit of FIG. 20.
Figure 24:
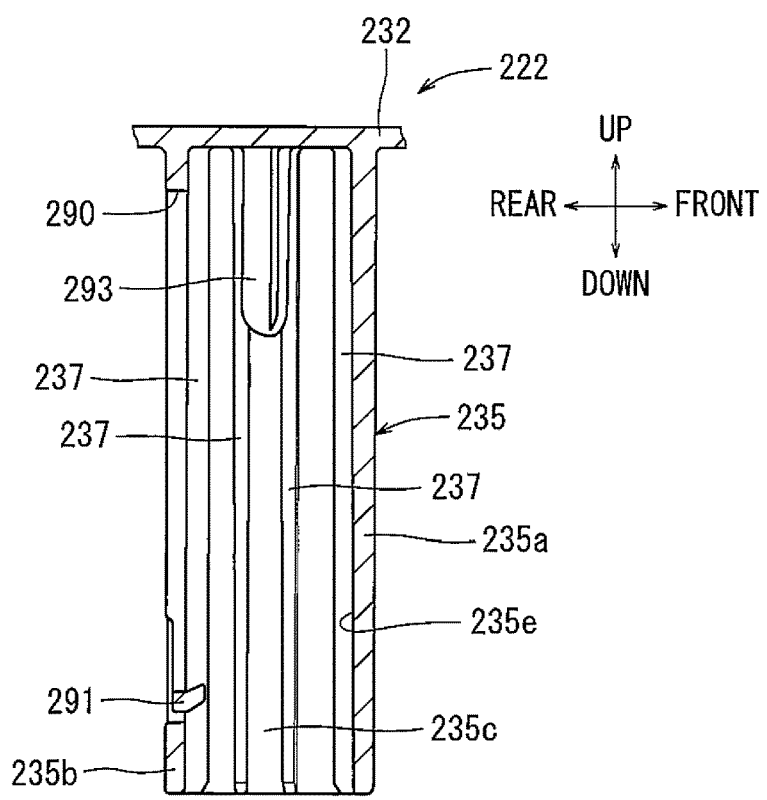
FIG. 24 is a lateral cross-sectional view of the tubular portion of the flange unit of FIG. 20.

FIG. 23 is a bottom view of the outer tubular portion 235 of the flange unit 222. FIG. 24 is a lateral cross-sectional view of the same. As shown in FIG. 23, the outer tubular portion 235 has a tubular shape with a substantially D-shaped cross-section as viewed from the bottom. The outer tubular portion 235 includes a front side wall 235a, a rear side wall 235b, a left side wall 235c, and a right side wall 235d. The front side wall 235a has a circular arc shape projecting in the radially outward direction, i.e., in the front direction. A recessed curved surface 235e having a recessed circular arc shape in a cross section orthogonal to the axial direction is formed on an inner surface (rear surface) of the front side wall 235a. The left side wall 235c and the right side wall 235d are oriented parallel to each other. In this embodiment, each side wall 235a, 235b, 235c, 235d of the outer tubular portion 235 has a substantially constant thickness in a circumferential direction.

A plurality of guiding ribs 237 project from the inner surface of the outer tubular portion 235. In this embodiment, eight guiding ribs 237 are provided. Two guiding ribs 237 are positioned at each of the side walls 235a, 235b, 235c, 235d of the tubular portion 235 at predetermined distances in a circumferential direction. The guiding ribs 237 are arranged symmetrically in the leftward/rightward direction. The guiding ribs 237 are formed in straight lines extending in the axial direction of the outer tubular portion 235 (i.e., in the upward/downward direction) (see FIG. 24). The guiding ribs 237 abut on or are proximal to respective outer flat surfaces 288a to 288d of the tubular column portion 287 (see FIG. 21). It should be noted that the guiding ribs 237 correspond to the "slide guide ribs" and the "rib-like portions" in the present description.

As shown in FIG. 24, an elongated engagement hole 290 extends in the upward/downward direction and is provided in the rear side wall 235b of the outer tubular portion 235. A U-shaped elastic engagement piece 291 is positioned at a lower end of the engagement hole 290 (see FIG. 16). The elastic engagement piece 291 is formed so as to be elastically deformable in the frontward/rearward direction.

A spring guide 293 is disposed within a base end (i.e., an upper end of the outer tubular portion 235) by integral molding. The spring guide 293 has a rod shape and extends vertically downward from the center of the top surface of the outer tubular portion 235. A cross-section of the spring guide 293 perpendicular to the axial direction has a Y-shape in this embodiment (see FIG. 23).

Figure 25:
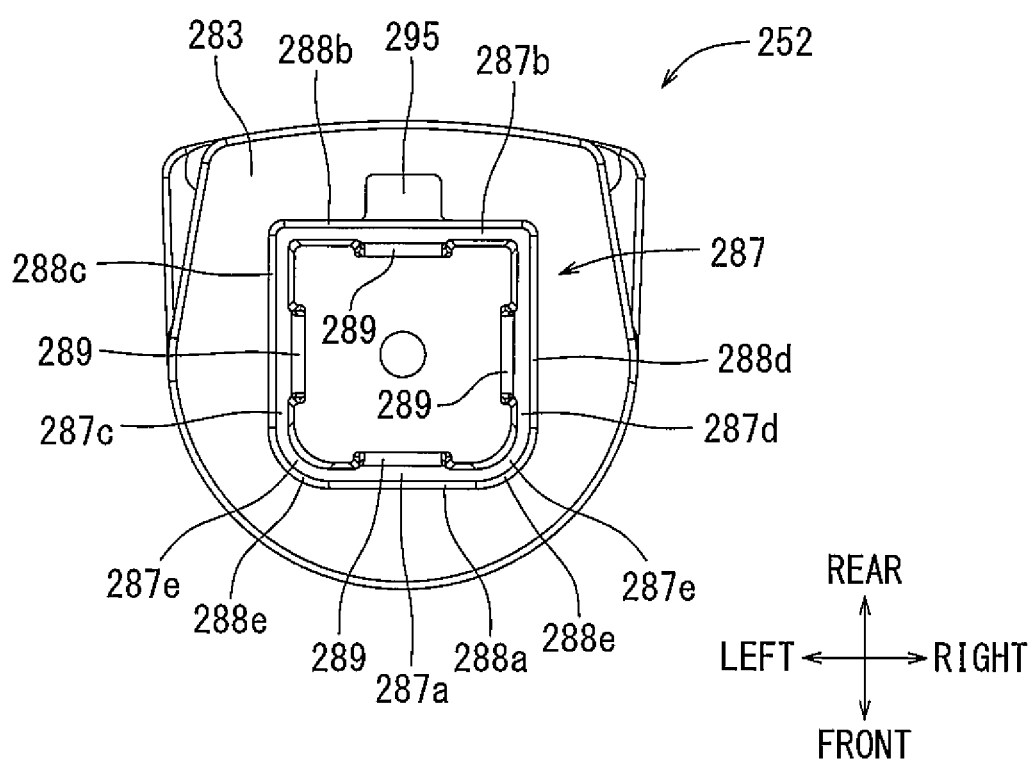
FIG. 25 is a plan view of the connection strut of FIG. 20.

FIG. 25 is a plan view illustrating the connection strut 252. As shown in FIG. 25, the tubular column portion 287 of the connection strut 252 has a substantially square tubular shape. The tubular column portion 287 includes a frons side wall 287a, a rear side wall 287b, a left side wall 287c, and a right side wall 287d. Outer surfaces of the side walls 287a, 287b, 287c, 287d of the tubular column portion 287 include four flat surfaces defining a rectangular shape in a cross-section perpendicular to the axial direction. In particular, the front side wall 287a defines a front flat surface 288a, the rear wall 287b defines a rear flat surface 288b, the left side wall 287c defines a left flat surface 288c, and the right side wall 287d defines a right flat surface 288d.

The four flat surfaces 288a, 288b, 288c, 288d form straight lines in a cross section perpendicular to the axial direction. Circular arc walls 287e having a ¼ circular arc cross-section are symmetrically formed at the front left and right projecting corners on the outer surface of the tubular column portion 287 (i.e. the projecting corner between the front side wall 287a and the left side wall 287c, and the projecting corner between the front side wall 287a and the right side wall 287d). Projecting curved surfaces 288e has circular arc shape in a cross section perpendicular to the axial direction and is provided on the outer surface of the circular arc wall 287e.

An engagement projection 295 extends in the rearward direction from the center of the upper end of the rear side wall 287b of the tubular column portion 287 (see FIG. 20). Further, in this embodiment, each of the side walls 287a, 287b, 287c, 287d of the tubular column portion 287 has a substantially constant thickness in the circumferential direction. Slightly projecting guide projections 289 having a predetermined widths are formed in the center of the inner surfaces of each of the side walls 287a, 287b, 287c, 287d in the width direction. The guide projections 289 are optional and may be omitted in other embodiments.

As shown in FIG. 20, the coil spring 285 is inserted into the tubular column portion 287. The outer peripheral surface of the coil spring 285 abuts or is proximal the guide projections 289 of the tubular column portion 287. Subsequently, the tubular column portion 287 is inserted into the outer tubular portion 235 from the bottom. At this moment, the engagement projection 295 of the tubular column portion 287 interferes with the elastic engagement piece 291 of the outer tubular portion 235, but then moves over the elastic engagement piece 291 via the elastic deformation (flexible deformation) of the elastic engagement piece 291. As a result, the engagement projection 295 is engaged in the engagement hole 290 of the outer tubular portion 235 so as to be movable within the predetermined range in the upward/downward direction. Further, the upper end of the coil spring 285 is fitted into the spring guide 293 within the outer tubular portion 235. The outer tubular portion 235 and the tubular column portion 287 are biased apart in opposite directions (i.e., extension direction).

When the connection strut 252 is suspended by the outer tubular portion 235 in this state, the engagement projection 295 of the tubular column portion 287 is locked to the elastic engagement piece 291 of the outer tubular portion 235. This prevents the connection strut 252 from decoupling from or coming off from the outer tubular portion 235. The elastic engagement piece 291 and the engagement projection 295 define a snap fit configured to allow the tubular column portion 287 and the outer tubular portion 235 to move relative to each other in the upward/downward direction, while also allowing the tubular column portion 287 to be suspended from the outer tubular portion 235 in the upward/downward direction.

As shown in FIG. 21, the respective guiding ribs 237 in the outer tubular portion 235 slidably guide the tubular column portion 287 in the axial direction (i.e., the upward/downward direction), and abut or are positioned proximal the respective flat surfaces 288a, 288b, 288c, 288d, which correspond to the outer surface of the tubular column portion 287. This allows the tubular column portion 287 to be maintained in coaxial alignment with the outer tubular portion 235. In this embodiment, two guiding ribs 237 face each flat surfaces 288a, 288b, 288c, 288d of the tubular column portion 287. The two guiding ribs 237 of the rear flat surface 288b are positioned to face both ends of the flat surface 288b in the width direction (leftward/rightward direction).

The recessed curved surface 235e of the outer tubular portion 235 and both projecting curved surfaces 288e of the tubular column portion 287 are arranged in a facing manner. The facing distance S between the recessed curved surface 235e and the corresponding recessed surface 288e is less than the minimum projecting height H of the guiding ribs 237 adjacent to the curved surfaces 235e, 288e.

Figure 22:
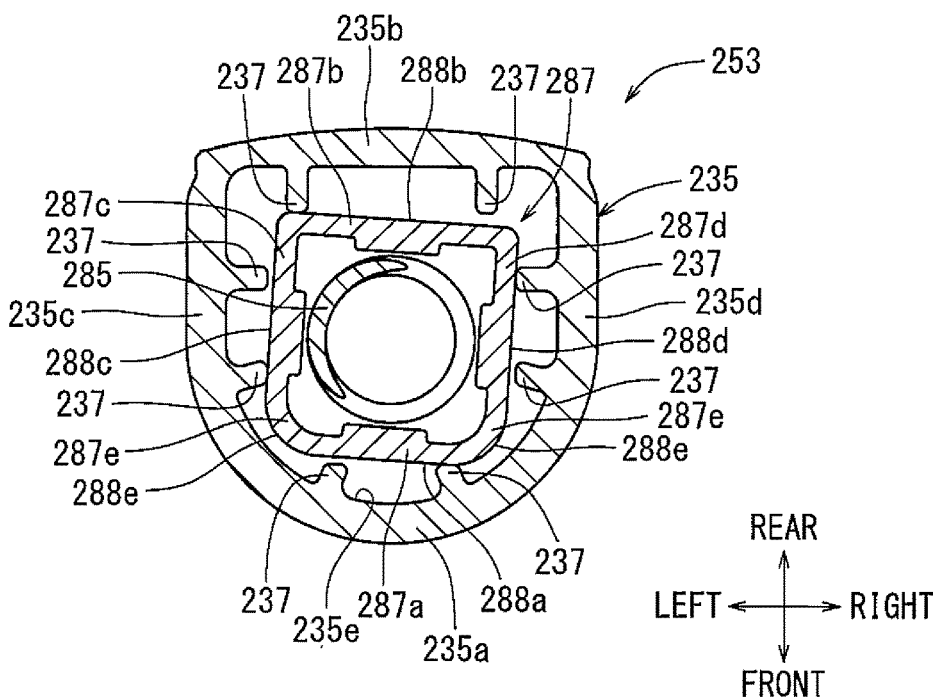
FIG. 22 is a sectional plan view of the telescopic connecting structure of FIG. 20 in a displaced state about an axial direction of the columnar portion.

When the tubular column portion 287 is shifted with respect to the outer tubular portion 235 in the direction about the axis (for example, the clockwise direction in FIG. 21), the flat surfaces 288a, 288b, 288c, 288d abut one of the two guiding ribs 237 facing the corresponding flat surface 288a, 288b, 288c, 288d (see FIG. 22). Further, when the tubular column portion 287 is shifted with respect to the outer tubular portion 235 in the opposite direction (the counter-clockwise direction in FIG. 21), the flat surfaces 288a, 288b, 288c, 288d abut the other one of the two guiding ribs 237 facing the corresponding flat surfaces 288a, 288b, 288c, 288d.

An average thickness of the outer tubular portion 235 is set to be greater than an average thickness of the tubular column portion 287.

According to the above-described telescopic connecting structure 253, when the tubular column portion 287 extends or contracts with respect to the outer tubular portion 235, the guiding ribs 237 slidably guide the tubular column portion 287, thereby reducing the contact areas therebetween. Thus, the sliding resistance of the tubular column portion 287 with respect to the outer tubular portions 235 can be reduced. The slidability of the tubular column portion 287 with respect to the outer tubular portion 235 may thus be improved, thereby enabling the tubular column portion 287 to slide smoothly. In addition, the strength of the outer tubular portion 235 can be enhanced by the guiding ribs 237.

Further, since the guiding ribs 237 slidably contact the respective flat surfaces 288a, 288b, 288c, 288d of the tubular column portions 287, the tubular column portion 287 can be more consistently slidably guided than as compared to the guiding ribs 237 slidably contacting non-flat surfaces.

The number of the guiding ribs 237 facing the respective flat surfaces 288a to 288d may be two. Therefore, it is possible to prevent displacement of the tubular column portion 287 with respect to the outer tubular portion 235 in the circumferential direction about the axis, and to prevent reduction of slidability of the tubular column portion 287 due to the displacement. More than three guiding ribs 237 may be arranged on at least one of the respective flat surfaces 288a, 288b, 288c, 288d, or one may be reduced from at least one of the respective flat surfaces 288a, 288b, 288c, 288d.

Further, two guiding ribs 237 facing the rear flat surfaces 288b are disposed in positions facing both ends of the rear flat surface 288b in the width direction (leftward/rightward direction). Accordingly, the distance between the two guiding ribs 237 can be increased compared with a case where the two guiding ribs 237 facing the rear flat surface 288b are disposed in positions other than both ends of the rear flat surfaces 288b. This may reduce the displacement amount (rotation amount) of the tubular column portion 287 in the circumferential direction about the axis with respect to the outer tubular portion 235. Regarding the flat surfaces 288a, 288c, 288d of the tubular column portion 287, the two guiding ribs 237 are preferably arranged in positions facing both ends of each corresponding flat surface 288a, 288c, 288d.

Further, when the tubular column portion 287 shifts with respect to the outer tubular portion 235 in the circumferential direction about the axis, the flat surfaces 288a, 288b, 288c, 288d abut to one of the two guiding ribs 237 facing each of the corresponding flat surfaces 288a, 288b, 288c, 288d. Therefore, it is possible to reliably restrict and/or prevent displacement of the tubular column portion 287 with respect to the outer tubular portion 235 in the circumferential direction about the axis. Further, it is possible to prevent biting of the projecting corners of the tubular column portion 287 between the adjacent guiding ribs 237 due to the displacement of the tubular column portion 287 with respect to the outer tubular portion 235 in the circumferential direction about the axis. This may minimize and/or avoid a reduction of the slidablity of the tubular column portion 287.

Further, the projecting curved surfaces 288e are formed on the front left and right projecting corners of the outer surface of the tubular column portion 287. Additionally, the recessed curved surface 235e facing the projecting curved surfaces 288e is formed on the inner surface of the outer tubular portion 235. It is thus possible to reduce stress concentrations in a radial direction and an axial direction within the outer tubular portion 235 and the tubular column portion 287 in response to a horizontal external force in the event of a vehicle collision or an external force in a direction pushing the fuel tank 210 upward.

It is also possible to reduce a contour of the outer tubular portion 235 with respect to the tubular column portion 287 or to increase a contour of the tubular column portion 287 with respect to the outer tubular portion 235 by narrowing the facing distance S between each projecting curved surface 288e and the recessed curved surface 235e.

Further, the average thickness of the outer tubular portion 235 may be greater than the average thickness of the tubular column portion 287. Therefore, the strength of the outer tubular portion 235 may be made to be greater than the strength of the tubular column portion 287 so as to prevent the outer tubular portion 235 from breaking in the event of a vehicle collision.

Further, in the present embodiment (see FIG. 20), the strut attachment portion 259 of the sub-tank main body 246 is made to be more fragile than the connection strut 252. Furthermore, when a force point of load received in the event of vehicle collision is set to be P1, a fulcrum point is set to be P2, and an action point is set to be P3, the distance K between the force point P1 and the action point P3 is shorter. As a result, the strut attachment portion 259 is likely to be broken before the flange unit 222 in the event of a vehicle collision, thereby suppressing breakage of the flange unit 222.

Figure 26:
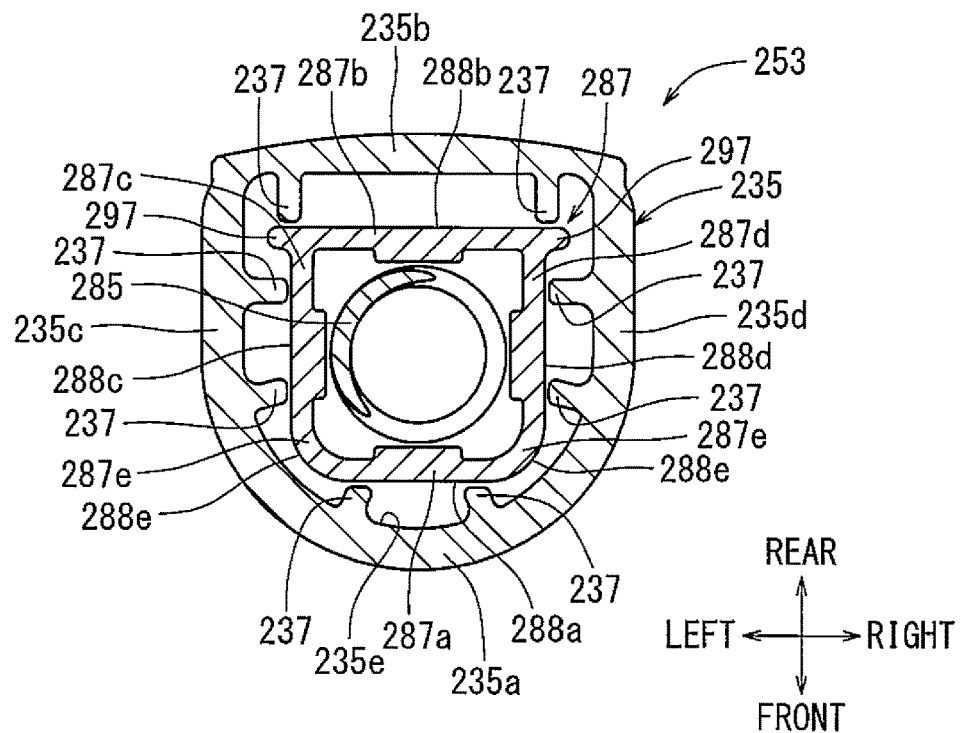
FIG. 26 is a sectional plan view of a telescopic connecting structure according to a third embodiment.

A third embodiment corresponds to the second embodiment with some modifications to the telescopic connecting structure 253. Therefore, the modified parts thereof will be described, however, the same parts as the second embodiment shall be denoted by the same reference numerals and will not be described. FIG. 26 is a sectional plan view illustrating the telescopic connecting structure 253. As shown in FIG. 26, protruding portions 297, each of which has a rib shape protruding outwardly, extend in the leftward/rightward direction from left and right ends of the rear side wall 287b of the tubular column portion 287. The protruding portions 297 extending linearly in the axial direction of the tubular column portion 287. Accordingly, the width of the rear flat surface 288b in the leftward/rightward direction is increased.

Two guiding ribs 237 facing the rear flat surface 288b of the outer tubular portion 235 are positioned to face both protruding portions 297 of the tubular column portion 287. Since protruding portions 297 increase the width of the rear flat surface 288b, the distance between the two guiding ribs 237 facing the rear flat surface 288b is greater than that of the second embodiment (see FIG. 21).

Figure 27:
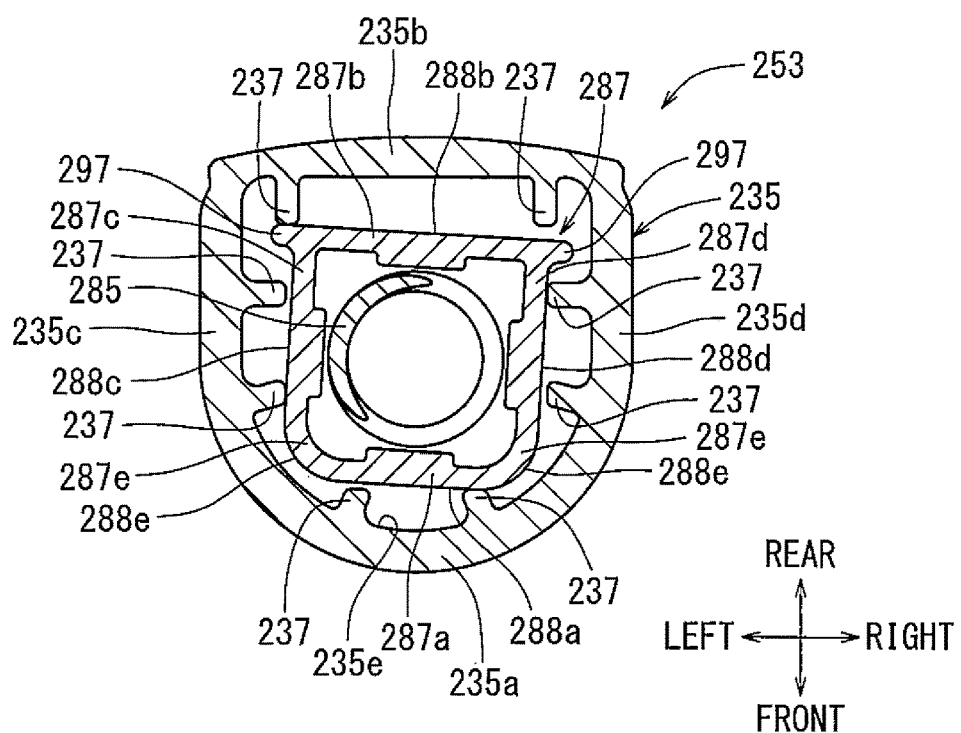
FIG. 27 is a sectional plan view of the telescopic connecting structure of FIG. 26 in a displaced state about an axial direction of the columnar portion.

According to the third embodiment, when the tubular column portion 287 is shifted with respect to the outer tubular portion 235 in the circumferential direction about the axis, one of the two guiding ribs 237 facing each of the flat surfaces 288a, 288b, 288c, 288d of the tubular column portion 237 abuts the corresponding flat surface 288a, 288b, 288c, 288d similar to the second embodiment. For example, as shown in FIG. 27, when the tubular column portion 287 is shifted with respect to the outer tubular portion 235 in the clockwise direction, one of the protruding portions 297 (the left one in FIG. 27) abuts the corresponding guiding rib 237, and when the tubular column portion 287 is shifted with respect to the outer tubular portion 235 in the opposite direction (counterclockwise direction), the other one of the protruding portions 297 (the right one in FIG. 27) abuts the corresponding guiding rib 237. This may reduce the displacement amount (rotation amount) of the tubular column portion 287 in the circumferential direction about the axis with respect to the outer tubular portion 235 as compared to other embodiments (e.g., the second embodiment shown in FIG. 21).

The embodiments disclosed herein have been described above and shown, however, they may be carried out in other various forms. For example, the embodiments disclosed in the present description shall not be limited to the fuel supply device 20 for a vehicle, such as an automobile or the like, but may also be adopted to other fuel supply devices. Further, the joint member 24 may be positioned on the side of the pump unit 26 in a fixed manner. Furthermore, the telescopic connecting structure 152 shall not be limited to a pair of left and right sets, but may also be a set of one or a set of three or more. Moreover, the shape of the support column portion 160 shall not be limited to a rectangular columnar shape, but may also have a cylindrical columnar shape. Moreover, the retainer 162 may be omitted. In addition, the number of bridge portions installed between the opposing parts of the tubular portions 43 may be changed to one or three or more. Further, the number of the side tubular portions 43 may be changed to one or three or more. Moreover, the side tubular portions 43 may be disposed in a close positional relation such that the opposing parts of the side tubular portions 43 may be connected to each other via a common wall portion.

Moreover, the center tubular portion 42 and/or the side tubular portions 43 may not be connected to one or more of the other tubular portions. Moreover, the connection strut 252 may be integrally formed with the sub-tank main body 246. Moreover, the tubular shape of the tubular column portion 287 and/or the outer tubular portion 235 may be modified to a cylindrical shape, a rectangular tubular shape or the like. Moreover, the tubular column portion 287 may be modified to be solid. Moreover, the shape of the outer surface of the outer tubular portion 235 may be appropriately changed.

What is claimed is:

1. A cover for a fuel tank, comprising:
a cover member configured to close an opening of the fuel tank; and
a connecting member movably coupled to the cover member and configured to move relative to the cover member in an upward/downward direction, wherein:
the cover member includes a first tubular portion and a second tubular portion arranged side-by-side, wherein each tubular portion extends in the upward/downward direction;
the cover member includes a connecting portion connecting opposing parts of the first tubular portion and the second tubular portion;
the connecting member includes a first columnar portion extending in the upward/downward direction, wherein the first columnar portion is inserted into the first tubular portion and is configured to move in the upward/downward direction relative to the first tubular portion; and
an axial length of the connecting portion is equal to an axial length of each of the first tubular portion and the second tubular portion.

2. The cover for the fuel tank according to claim 1, wherein:
the first tubular portion and the second tubular portion are laterally spaced apart; and
the connecting portion is a bridge portion extending between the opposing parts of the first tubular portion and the second tubular portion.

3. The cover for the fuel tank according to claim 1, wherein:
the first tubular portion and the second tubular portion are disposed laterally adjacent to each other; and
the connecting portion is a common wall portion sharing the opposing parts of the first tubular portion and the second tubular portion.

4. The cover for the fuel tank according to claim 1, wherein the first tubular portion includes a circular arc wall portion having a circular shape that extends radially outward from a part thereof.

5. The cover for the fuel tank according to claim 4, wherein the circular arc wall portion is disposed about an axis of the first tubular portion.

6. The cover for the fuel tank according to claim 1, wherein the first tubular portion includes rib-like portions extending in an axial direction along an inner surface of the first tubular portion.

7. A telescopic connecting structure for connecting a cover member configured to close an opening of a fuel tank to an in-tank component disposed on a bottom of the fuel tank, the telescopic connecting structure comprising:
a tubular portion extending vertically downward from the cover member;
a columnar portion extending vertically upward from the in-tank component;

wherein the columnar portion is slidingly received by the tubular portion and configured to move vertically relative to the tubular portion;

at least one guide rib extending vertically along an inner surface of the tubular portion and configured to slidably guide the columnar portion within the tubular portion;

wherein:

an outer surface of the columnar portion includes a front flat surface, a rear flat surface, a right flat surface, and a left flat surface that collectively form a substantially rectangular cross sectional shape;

a rear right corner and a rear left corner of the outer surface of the columnar portion each have an L-shape cross sectional shape;

a front right corner and a front left corner of the outer surface of the columnar portion each comprises a projecting curved surface having a protruding circular arc cross-sectional shape;

the inner surface of the tubular portion includes a front side wall, a rear side wall, a right side wall, and a left side wall that collectively form a substantially D-shape cross sectional shape;

a rear right recessed corner portion and a rear left recessed corner portion of the inner surface of the tubular portion each have an L-shape cross sectional shape; and a front side wall of the inner surface of the tubuklar portion includes a recessed curved surface facing the projecting curved surfaces of the outer surface of the columnar portion, the recessed curved surface has a recessed circular arc cross sectional shape.

8. The telescopic connecting structure according to claim 7, wherein:

the at least one guide rib is positioned to face the front flat surface, the rear flat surface, the right flat surface, and the left flat surface.

9. The telescopic connecting structure according to claim 8, wherein the at least one guide rib comprises a plurality of guide ribs, wherein each guide rib faces the front flat surface, the rear flat surface, the right flat surface, or the left flat surface.

10. The telescopic connecting structure according to claim 9, wherein the plurality of the guide ribs include two side guide ribs facing each of the front flat surface, the rear flat surface, the right flat surface, and left flat surface.

11. The telescopic connecting structure according to claim 9, wherein:

the number of the guide ribs facing each of the front flat surface, the rear flat surface, the right flat surface, and the left flat surface is two; and when the columnar portion is disposed about the tubular portion, and each flat surfaces slidingly engages one at least one guide rib.

12. The telescopic connecting structure according to claim 7, wherein:

the columnar portion has a substantially rectangular tubular shape; and an average thickness of the tubular portion is greater than an average thickness of the columnar portion.

13. The telescopic connecting structure according to claim 7, wherein a distance between the projecting curved surface and the corresponding recessed curved surface is less than a projecting height of the guide rib adjacent to the projecting curved surface and the corresponding recessed curved surface.

14. The telescopic connecting structure according to claim 7, wherein the rear flat surface of the columnar portion includes a protruding portion protruding further than the rear right projecting corner or the rear left projecting corner of the outer surface of the columnar portion.

\* \* \* \* \*